United States Patent
Da Silva et al.

(10) Patent No.: US 9,185,581 B2
(45) Date of Patent: Nov. 10, 2015

(54) CLASSIFYING FAILURE REPORTS AS EITHER CURRENT OR STALE FOR MOBILITY ROBUSTNESS OPTIMIZATION ADJUSTMENTS

(71) Applicant: Telefonaktiebolaget L M Ericsson (publ), Stockholm (SE)

(72) Inventors: Icaro Leonardo J. Da Silva, Sollentuna (SE); Angelo Centonza, Winchester (GB); Oumer Teyeb, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 232 days.

(21) Appl. No.: 13/888,778

(22) Filed: May 7, 2013

(65) Prior Publication Data

US 2013/0303155 A1    Nov. 14, 2013

Related U.S. Application Data

(60) Provisional application No. 61/645,868, filed on May 11, 2012.

(51) Int. Cl.
| | |
|---|---|
| *H04W 24/00* | (2009.01) |
| *H04W 24/02* | (2009.01) |
| *H04W 24/08* | (2009.01) |
| *H04W 24/04* | (2009.01) |
| *H04W 36/14* | (2009.01) |

(52) U.S. Cl.
CPC .............. *H04W 24/02* (2013.01); *H04W 24/08* (2013.01); *H04W 24/04* (2013.01); *H04W 36/14* (2013.01)

(58) Field of Classification Search
USPC ............... 455/423, 67.11, 436, 437, 438; 370/245, 331
See application file for complete search history.

(56) References Cited

PUBLICATIONS

Huawei, "R3-120390: IRAT MRO Way Forward," 3rd Generation Partnership Project (3GPP), TSG-RAN WG3 Meeting #75, Feb. 6-10, 2012, 3 pages, Dresden, Germany.
Author Unknown, "Technical Specification Group Radio Access Network; Evolved Universal Terrestrial Radio Access (E-UTRA); Radio Resource Control (RRC); Protocol specification (Release 10)," 3GPP, Technical Specification 36.331, 3GPP Organizational Partners, Mar. 14, 2012, Version 10.5.0, 302 pages.
Catt, "R3-120507: Open issues of inter-RAT MRO," 3rd Generation Partnership Project (3GPP), TSG RAN WG3 Meeting #75bis, Mar. 26-30, 2012, 2 pages, San Jose del Cabo, Mexico.
Huawei, "R3-102713: IRAT too late," 3rd Generation Partnership Project (3GPP), TSG RAN WG3 Meeting #69bis, Oct. 11-15, 2010, 4 pages, Xi'an, China.
International Search Report and Written Opinion for PCT/SE2013/000069 mailed Jan. 20, 2014, 12 pages.

*Primary Examiner* — Charles Appiah
*Assistant Examiner* — Alexander Yi
(74) *Attorney, Agent, or Firm* — Withrow & Terranova, PLLC

(57) ABSTRACT

The present disclosure relates to identifying stale failure reports in a cellular communications network. In one embodiment, a node in a cellular communications network receives a failure report associated with a connection failure for a user equipment and determines when the connection failure occurred with respect to a most recent mobility adjustment made by the node. If the connection failure occurred before the most recent mobility adjustment made by the node, the node classifies the failure report as a stale failure report. In one embodiment, if the failure report is classified as a stale failure report, the node discards the failure. In another embodiment, if the failure report is classified as a stale failure report, the node considers the failure report with reduced relevance for a next iteration of a process to determine whether new mobility adjustments are desired.

13 Claims, 30 Drawing Sheets

```
RLF-Report-r9 ::=           SEQUENCE {
    measResultLastServCell-r9   SEQUENCE {
        rsrpResult-r9               RSRP-Range,
        rsrqResult-r9               RSRQ-Range          OPTIONAL
    },
    measResultNeighCells-r9     SEQUENCE {
        measResultList2EUTRA-r9     MeasResultList2EUTRA-r9    OPTIONAL,
        measResultList2UTRA-r9      MeasResultList2UTRA-r9     OPTIONAL,
        measResultListGERAN-r9      MeasResultListGERAN        OPTIONAL,
        measResultsCDMA2000-r9      MeasResultList2CDMA2000-r9 OPTIONAL
    } OPTIONAL,
    ...,
    [[ locationInfo-r10             LocationInfo-r10    OPTIONAL,
       failedPCellId-r10            CHOICE {
           cellGlobalId-r10             CellGlobalIdEUTRA,
           pci-arfcn-r10                SEQUENCE {
               physCellId-r10               PhysCellId,
               carrierFreq-r10              ARFCN-ValueEUTRA
           }
       }                                                OPTIONAL,
       reestablishmentCellId-r10    CellGlobalIdEUTRA   OPTIONAL,
       timeConnFailure-r10          INTEGER (0..1023)   OPTIONAL,
       connectionFailureType-r10    ENUMERATED {rlf, hof}  OPTIONAL,
       previousPCellId-r10          CellGlobalIdEUTRA   OPTIONAL
    ]]
}
```

FIG. 4
(PRIOR ART)

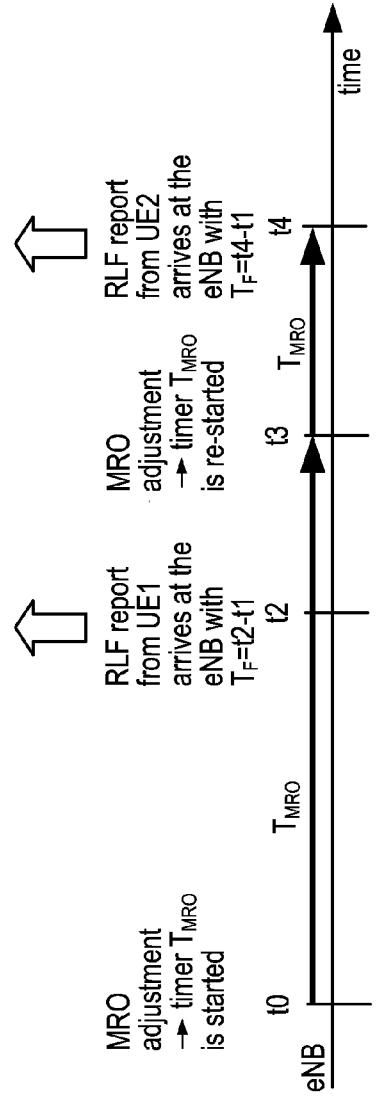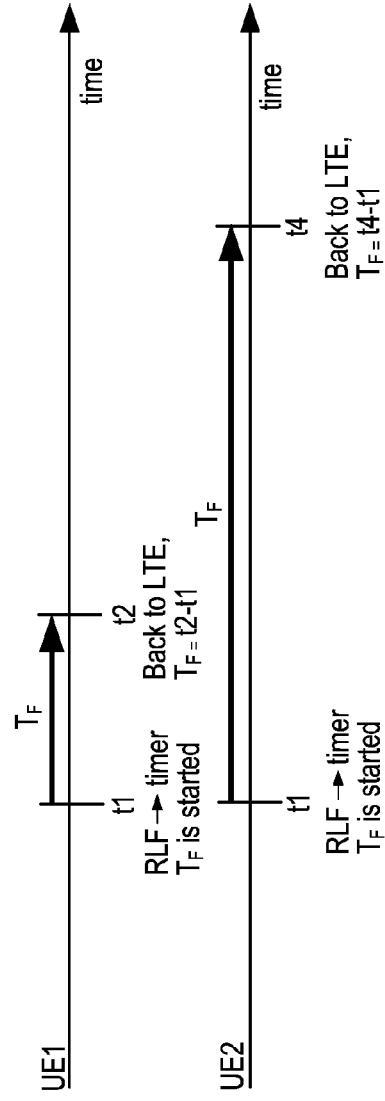
FIG. 20

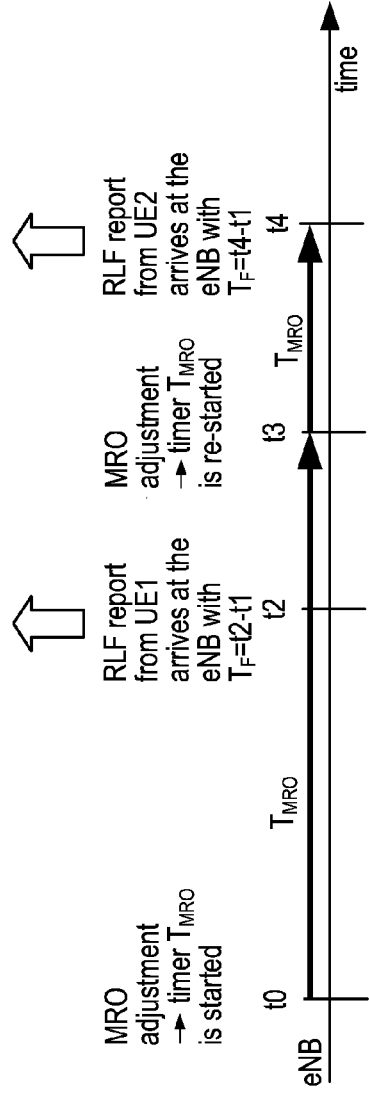
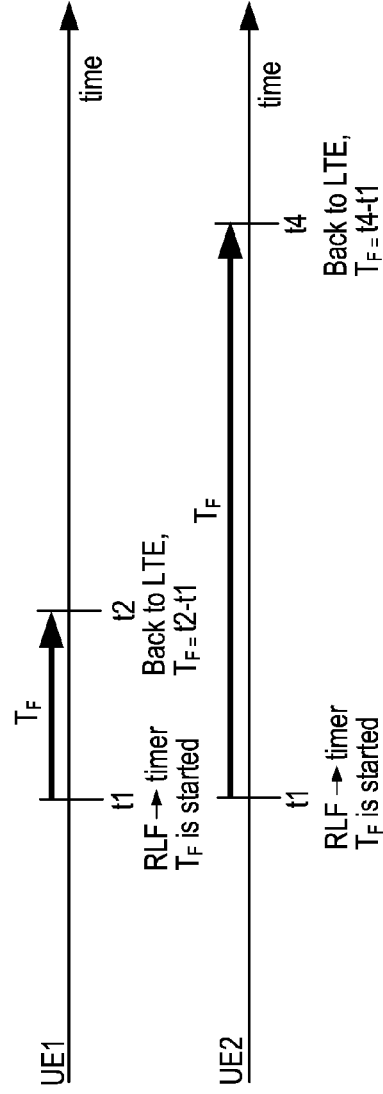
FIG. 26

CLASSIFYING FAILURE REPORTS AS EITHER CURRENT OR STALE FOR MOBILITY ROBUSTNESS OPTIMIZATION ADJUSTMENTS

RELATED APPLICATIONS

This application claims the benefit of provisional patent application Ser. No. 61/645,868, filed May 11, 2012, the disclosure of which is hereby incorporated herein by reference in its entirety.

FIELD OF THE DISCLOSURE

The present disclosure relates to reporting connection failures in a cellular communications network.

BACKGROUND

One issue that must be handled by all cellular communications networks is mobility of mobile devices. In particular, a cellular communications network must enable handovers of mobile devices between cells within the same Radio Access Network (RAN) as well as enable handover of mobile terminals between different RANs. A common mobility issue is mobility connection failures, i.e., connection failures during or shortly after the handover process. In order to address this mobility issue, according to discussions in the 3$^{rd}$ Generation Partnership Project (3GPP), a mobile device, which is referred to as a User Equipment or User Element (UE), is required to transmit a failure report to the cellular communications network whenever a mobility connection failure occurs. The failure report will then be used by a Mobility Robustness Optimization (MRO) function of the cellular communications network to optimize mobility settings, or mobility parameters, that control handovers within the cellular communications network.

With respect to Inter-Radio Access Technology (IRAT) handovers (HOs), 3GPP RAN Working Group 3 (WG3) has identified multiple high priority scenarios that present mobility issues and therefore need to be addressed. As illustrated in FIGS. 1A and 1B, an IRAT HO is a handover of a UE 10 between a cell 12 served by a base station (BS) 14 in a RAN operating according to one Radio Access Technology (RAT) (e.g., an enhanced Node B (eNB) in a RAN of a 4G Long Term Evolution (LTE) cellular communications network) and a cell 16 served by a base station 18 in another RAN operating according to another RAT (e.g., a Node B in a Universal Terrestrial Radio Access Network (UTRAN) of a 3G Universal Mobile Telecommunications System (UMTS) cellular communications network). In particular, the scenarios identified by 3GPP RAN WG3 are:

Scenario 1: A mobility connection failure, specifically a Radio Link Failure (RLF), while in an LTE RAN or during a HO from the LTE RAN to a 2G/3G RAN (e.g., a UTRAN) followed by a reconnection to the 2G/3G RAN (i.e., a too late HO from an LTE RAN to a 2G/3G RAN).

Scenario 2: A mobility failure during or after a HO from a 2G/3G RAN (e.g., a UTRAN) to an LTE RAN followed by a reconnection back to the 2G/3G RAN (i.e., the source RAT). The reconnection may be to the source cell for the HO or a different cell in the 2G/3G RAN. This is referred to herein as a too early HO from a 2G/3G RAN to an LTE RAN.

Scenario 2a: A handover failure (HOF) during the HO from the 2G/3G RAN to the LTE RAN (i.e., a HOF during a Random Access Channel (RACH) attempt in the LTE RAN) followed by the reconnection back to the 2G/3G RAN.

Scenario 2b: An RLF in the LTE RAN shortly after the HO from the 2G/3G RAN to the LTE RAN (i.e., an RLF after successful RACH in the LTE RAN) followed by the reconnection back to the 2G/3G RAN.

Triggering of an IRAT HO from a cell in an LTE RAN to a cell in a UTRAN is controlled by mobility parameters in the LTE RAN associated with both Reference Signal Received Power (RSRP) and Reference Signal Received Quality (RSRQ) measurement types. These mobility parameters in the LTE RAN form a HO threshold, which is referred to herein as ho_thresh_lte. One way to optimize Scenario 1 (i.e., too late HOs from LTE RAN to 2G/3G RAN, e.g., a UTRAN) is to increase the value of ho_thresh_lte in order to trigger HOs from the LTE RAN to the 2G/3G RAN earlier. However, doing so may increase the number of unnecessary HOs, i.e., HOs from the LTE RAN to the 2G/3G RAN even when the coverage of the LTE RAN is sufficient to maintain the connection. This tradeoff between decreasing the number of too late HOs and increasing the number of unnecessary HOs is illustrated in FIG. 2. An MRO algorithm should take this tradeoff into account to increase or decrease ho_thresh_lte.

Triggering of an IRAT HO from a cell in a UTRAN to a cell in an LTE RAN is controlled by other mobility parameters in the UTRAN associated with both RSRP and RSRQ measurement types. These mobility parameters in the UTRAN form a HO threshold, which is referred to herein as ho_thresh_utran. One way to optimize Scenario 2 (i.e., too early HOs from 2G/3G RAN, e.g., a UTRAN or Global System for Mobile Communications (GSM) Enhanced Data Rates for Global Evolution (EDGE) RAN (GERAN), to an LTE RAN) is to increase the value of ho_thresh_utran in order to only trigger a HO to the LTE RAN when the signal from the LTE RAN is strong enough to retain the connection. However, doing so may unnecessarily increase time in the UTRAN if ho_thresh_utran is set too high such that the UE 10 remains in the UTRAN even when the coverage of the LTE RAN is sufficient to retain a connection with the UE 10. This tradeoff is illustrated in FIG. 3 and should be taken into account by an MRO algorithm when increasing or decreasing the ho_thresh_utran.

The occurrence of too late and unnecessary HOs from an LTE RAN to a 2G/3G RAN are to be detected via RLF reports and unnecessary HO indicators. Procedures to be performed upon RLF detection are standardized in 3GPP Technical Specification (TS) 36.311 section 5.3.11.3. At the UE 10, when an RLF is detected, various information is stored in an RLF report as illustrated in FIG. 4. In the case where the RLF is followed by a Radio Resource Control (RRC) connection re-establishment procedure, the UE 10 sets the reestablishmentCellId in the RLF report to a global cell identity of the selected cell. Additional information to be reported in support of the MRO function particularly with respect to IRAT HOs is currently under discussion in 3GPP RAN3. At this point, the discussions are initially progressing towards a decision about how to make the RLF reports available to the different RATs as explained below.

Different solutions to making RLF reports associated with IRAT HOs available to the different RATs running MRO algorithms have been proposed. These solutions are described in 3GPP Written Contribution R3-120390, which is entitled "IRAT MRO way forward" and was presented in 3GPP Meeting R3-75 which was held from Feb. 6, 2012 through Feb. 10, 2012 in Dresden, Germany. As described in 3GPP Written Contribution R3-120390 and discussed below, there are four different solutions.

Solution 1: The first solution is reporting the RLF when returning to the LTE RAN. More specifically, for both Scenario 1 and Scenario 2 discussed above, when the UE reconnects to the 2G/3G RAN after the mobility failure, the UE stores the necessary information for the corresponding failure report. Then, when the UE is back in the LTE RAN, the failure information is transmitted to the LTE RAN as, for example, an RLF report. The base station in the LTE RAN that obtains the RLF report from the UE forwards the RLF to the base station that serves the cell where the corresponding mobility connection failure occurred via appropriate signaling (e.g., X2 or S1 signaling for Scenarios 1 and 2b and RAN Information Message (RIM) to the Radio Network Controller (RNC) of the base station serving the cell in the 2G/3G RAN before the IRAT HO for Scenario 2a).

Solution 1 for Scenario 1 is illustrated in FIG. 5. As illustrated, a UE experiences an RLF in the LTE RAN. After the RLF, the UE connects to Cell Y in the 3G RAN and stores the RLF report. Subsequently, when the UE reconnects to the LTE RAN by, in this example, an IRAT HO from Cell Y in the 3G RAN to Cell B in the LTE RAN, the UE sends the RLF report to the base station corresponding to Cell B in the LTE RAN. The base station corresponding to Cell B sends the RLF report to the base station corresponding to Cell A where the RLF occurred. The MRO function of the base station for Cell A determines that an amount of time that the UE was connected to Cell A before the RLF ($\Delta t$) is greater than a predefined minimum amount of time (t_min) and, as such, the RLF was due to a too late IRAT HO from the LTE RAN to the 3G RAN.

Solution 1 for Scenario 2a is illustrated in FIG. 6. After a HO failure (i.e., unsuccessful RACH attempts) during an IRAT HO from Cell X of the 3G RAN to Cell A of the LTE RAN, the UE reconnects to Cell Y of the 3G RAN. Subsequently, when the UE reconnects to the LTE RAN by, in this example, an IRAT HO from Cell Y in the 3G RAN to Cell B in the LTE RAN, the UE sends the RLF report to the base station corresponding to Cell B in the LTE RAN. The base station corresponding to Cell B in the LTE RAN determines that the mobility failure is an IRAT HOF from Cell X in the 3G RAN and, as such, sends the RLF report to the RNC for the base station corresponding to Cell X of the 3G RAN via a RIM.

Solution 1 for Scenario 2b is illustrated in FIG. 7. Shortly after an IRAT HO from Cell X of the 3G RAN to Cell A of the LTE RAN, the UE experiences an RLF. After the RLF, the UE reconnects to Cell Y of the 3G RAN. Subsequently, when the UE reconnects to the LTE RAN by, in this example, an IRAT HO from Cell Y in the 3G RAN to Cell B in the LTE RAN, the UE sends the RLF report to the base station corresponding to Cell B in the LTE RAN. The base station corresponding to Cell B in the LTE RAN determines that the mobility failure is an RLF shortly after the IRAT HO from Cell X in the 3G RAN to Cell A in the LTE RAN (i.e., the IRAT is a too early IRAT) and, as such, sends the RLF report to the RNC for the base station corresponding to Cell X of the 3G RAN via a RIM. In addition, the base station corresponding to Cell B may send the RLF report to the base station corresponding to Cell A in the LTE RAN where the RLF occurred via suitable signaling (e.g., X2 or S1).

Solution 2: The second solution is reporting the failure to the 2G/3G RAN and/or the LTE RAN where the UE reconnects after the mobility failure. More specifically, Solution 2 for Scenario 1 is illustrated in FIG. 8. As illustrated, the UE experiences an RLF in Cell A of the LTE RAN due to a too late HO to the 3G RAN. After the RLF, the UE stores the RLF report and sends the RLF report to the 3G RAN upon reconnecting to Cell Y of the 3G RAN. The RNC of the base station corresponding to Cell Y of the 3G RAN determines that the RLF report is the result of a too late IRAT HO from Cell A of the LTE RAN and therefore sends the RLF report to the base station corresponding to Cell A of the LTE RAN via a RIM.

Solution 2 for Scenario 2a is illustrated in FIG. 9. As illustrated, after a HO failure (i.e., unsuccessful RACH attempts) during an IRAT HO from Cell X of the 3G RAN to Cell A of the LTE RAN, the UE stores a corresponding RLF report and sends the RLF report to the 3G RAN upon reconnecting to Cell Y of the 3G RAN. The RNC of the base station corresponding to Cell Y of the 3G RAN determines that the RLF report is the result of a too early IRAT HO from Cell X of the 3G RAN to Cell A of the LTE RAN. In addition, the RNC may send the RLF report to the base station corresponding to Cell A of the LTE RAN via a RIM. Notably, the RLF report can be used by the MRO function of the RNC and/or an MRO function of the base station corresponding to Cell A of the LTE RAN. If the UE reconnects to the LTE RAN after the failure and the RLF report is not yet reported to the LTE RAN, the UE may send the RLF report to a serving base station in the LTE RAN. The serving base station can then forward the RLF report to the RNC of the base station corresponding to Cell X in the 3G RAN via a RIM and, if desired, send the RLF report to the base station corresponding to Cell A in the LTE RAN.

Solution 2 for Scenario 2b is illustrated in FIG. 10. As illustrated, shortly after an IRAT HO from Cell X of the 3G RAN to Cell A of the LTE RAN, the UE experiences an RLF. After the RLF, the UE stores an RLF report and sends the RLF report to the 3G RAN upon reconnecting to Cell Y of the 3G RAN. The RNC of the base station corresponding to Cell Y of the 3G RAN determines that the RLF report is the result of a too early IRAT HO from Cell X of the 3G RAN to Cell A of the LTE RAN. In addition, the RNC may send the RLF report to the base station corresponding to Cell A of the LTE RAN via a RIM. Notably, the RLF report can be used by the MRO function of the RNC and/or an MRO function of the base station corresponding to Cell A of the LTE RAN. If the UE reconnects to the LTE RAN after the failure and the RLF report is not yet reported to the LTE RAN, the UE may send the RLF report to a serving base station in the LTE RAN. The serving base station can then forward the RLF report to the RNC of the base station corresponding to Cell X in the 3G RAN via a RIM and, if desired, send the RLF report to the base station corresponding to Cell A in the LTE RAN.

Solution 3: The third solution is reporting the RLF to the RAT where the failure occurred and reporting the HO failure in the RAT of the cell in which the HO command was received. More specifically, Solution 3 for Scenario 1 is illustrated in FIG. 11. Notably, Solution 3 for Scenario 1 is the same as Solution 1 for Scenario 1. As illustrated, a UE experiences an RLF in the LTE RAN. After the RLF, the UE connects to Cell Y in the 3G RAN and stores the RLF report. Subsequently, when the UE reconnects to the LTE RAN by, in this example, an IRAT HO from Cell Y in the 3G RAN to Cell B in the LTE RAN, the UE sends the RLF report to the base station corresponding to Cell B in the LTE RAN. The base station corresponding to Cell B sends the RLF report to the base station corresponding to Cell A where the RLF occurred. The MRO function of the base station for Cell A determines that an amount of time that the UE was connected to Cell A before the RLF ($\Delta t$) is greater than a predefined minimum amount of time (t_min) and, as such, the RLF was due to a too late IRAT HO from the LTE RAN to the 3G RAN.

Solution 3 for Scenario 2a is illustrated in FIG. 12. As illustrated, after a HO failure (i.e., unsuccessful RACH attempts) during an IRAT HO from Cell X of the 3G RAN to Cell A of the LTE RAN, the UE stores a corresponding RLF report and sends the RLF report to the 3G RAN upon reconnecting to Cell Y of the 3G RAN. The RNC of the base station corresponding to Cell Y of the 3G RAN determines that the RLF report is the result of a too early IRAT HO from Cell X of the 3G RAN to Cell A of the LTE RAN. If desired, the RNC sends the RLF report to the base station corresponding to Cell A of the LTE RAN via a RIM.

Solution 3 for Scenario 2b is illustrated in FIG. 13. Notably, Solution 3 for Scenario 2b is the same as Solution 1 for Scenario 2b. Shortly after an IRAT HO from Cell X of the 3G RAN to Cell A of the LTE RAN, the UE experiences an RLF. After the RLF, the UE reconnects to Cell Y of the 3G RAN. Subsequently, when the UE reconnects to the LTE RAN by, in this example, an IRAT HO from Cell Y in the 3G RAN to Cell B in the LTE RAN, the UE sends the RLF report to the base station corresponding to Cell B in the LTE RAN. The base station corresponding to Cell B in the LTE RAN determines that the mobility failure is an RLF shortly after the IRAT HO from Cell X in the 3G RAN to Cell A in the LTE RAN (i.e., the IRAT is a too early IRAT) and, as such, sends the RLF report to the RNC for the base station corresponding to Cell X of the 3G RAN via a RIM. In addition, the base station corresponding to Cell B may send the RLF report to the base station corresponding to Cell A in the LTE RAN where the RLF occurred via suitable signaling (e.g., X2 or S1).

Solution 4: The fourth solution is sending the RLF report when returning to the LTE RAN in the case of a too late IRAT HO from the LTE RAN to the 2G/3G RAN and detecting the connection failure at the RNC of the 2G/3G RAN in the case of a too early IRAT HO from the 2G/3G RAN to the LTE RAN.

Solution 4 for Scenario 1 is illustrated in FIG. 14 and is the same as that for Solution 1, Scenario 1. For Solution 4, Scenarios 2a and 2b, the UE does not report the connection failure to the network. Rather, the RNC of the 2G/3G network can understand that the UE was previously camped on the 2G/3G network and is returning to the 2G/3G network after a connection failure during an IRAT HO to the LTE RAN.

As discussed in the Detailed Description below in detail, the inventors have found that the solutions for obtaining the RLF reports from the UEs in the various scenarios discussed above give rise to new issues with respect to delayed RLF reporting. As such, there is a need for systems and methods that address these new issues.

SUMMARY

The present disclosure relates to identifying stale failure reports in a cellular communications network. In one embodiment, a node in a cellular communications network receives a failure report associated with a connection failure for a User Equipment (UE) and determines when the connection failure occurred with respect to a most recent mobility adjustment made by the node. If the connection failure occurred before the most recent mobility adjustment made by the node, the node classifies the failure report as a stale failure report. In one embodiment, if the failure report is classified as a stale failure report, the node discards the failure report such that the failure report is not considered for a next iteration of a process to determine whether new mobility adjustments are desired. In another embodiment, if the failure report is classified as a stale failure report, the node considers the failure report with reduced relevance for a next iteration of a process to determine whether new mobility adjustments are desired.

In one embodiment, the failure report includes timing data that is indicative of a time at which the connection failure occurred, and the node determines when the connection failure occurred with respect to the most recent mobility adjustment made by the node based on the timing data. In one particular embodiment, the timing data includes a first timer value that defines an amount of time that has expired between the time at which the connection failure occurred and a time at which the UE transmitted the failure report, and the node determines when the connection failure occurred with respect to the most recent mobility adjustment made by the node based on the first timer value and a second timer value that defines an amount of time that has expired since the most recent mobility adjustment was made by the node.

In one embodiment, if the connection failure occurred after the most recent mobility adjustment made by the node, the node classifies the failure report as a current failure report. In one embodiment, if the failure report is classified as a current failure report, the node considers the failure report for a next iteration of a mobility optimization process.

In one embodiment, a UE in a multiple Radio Access Technology (RAT) cellular communications system detects a connection failure and thereafter transmits a failure report, where the failure report is associated with the connection failure and includes timing data that is indicative of a time at which the connection failure occurred. In one embodiment, the timing data includes a timer value that defines an amount of time that has expired between a time at which the connection failure occurred and a time at which the UE transmitted the failure report to the cellular communications network. In one particular embodiment, the UE starts the timer in response to detecting the connection failure. Thereafter, the UE detects a triggering event for transmitting the failure report and, in response to the triggering event, stops the timer and transmits the failure report including a value of the timer to the cellular communications network.

In one embodiment, the connection failure is a radio link failure in a cell served by a first base station in a first radio access network operating according to a first radio access technology, and the UE transmits the failure report to a base station in the first radio access network after reconnecting to the first radio access network. In one particular embodiment, the connection failure is a radio link failure in a cell served by a first base station in a first radio access network operating according to a first radio access technology, and the UE initially reconnects to a base station in a second radio access network operating according to a second radio access technology after the radio link failure. Sometime after reconnecting to the base station in the second radio access network, the UE connects to a base station in the first radio access network to thereby reconnect to the first radio access network, and the UE transmits the failure report to the base station in the first radio access network after reconnecting to the first radio access network.

In one embodiment, the connection failure is a connection failure associated with a handover from a cell served by a first base station in a first radio access network operating according to a first radio access technology to a cell served by a second base station in a second radio access network operating according to a second radio access technology. In this embodiment, the UE transmits the failure report to a base station in the second radio access network operating according to the second radio access technology after subsequently connecting to the base station in the second radio access network.

In one particular embodiment, the connection failure is a connection failure associated with a handover from a cell served by a first base station in a first radio access network operating according to a first radio access technology to a cell served by a second base station in a second radio access network operating according to a second radio access technology. In this embodiment, the UE initially connects to a base station in the first radio access network after the connection failure. Sometime thereafter, the UE connects to a base station in the second radio access network and transmits the failure report to the base station in the second radio access network after connecting to the base station in the second radio access network.

In one embodiment, the connection failure is a radio link failure in a cell served by a first base station in a first radio access network operating according to a first radio access technology, and the UE transmits the failure report to a second base station in a second radio access network operating according to a second radio access technology after connecting to the second base station of the second radio access network. In one particular embodiment, the connection failure is a radio link failure in a cell served by a first base station in a first radio access network operating according to a first radio access technology. Further, after the radio link failure, the UE connects to a second base station in a second radio access network operating according to a second radio access technology and transmits the failure report to the second base station in the second radio access network after connecting to the second base station of the second radio access network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4 illustrates information stored in an RLF report according to the present version of $3^{rd}$ Generation Partnership Project Technical Specification (3GPP TS) 36.331;

Figure 1A:
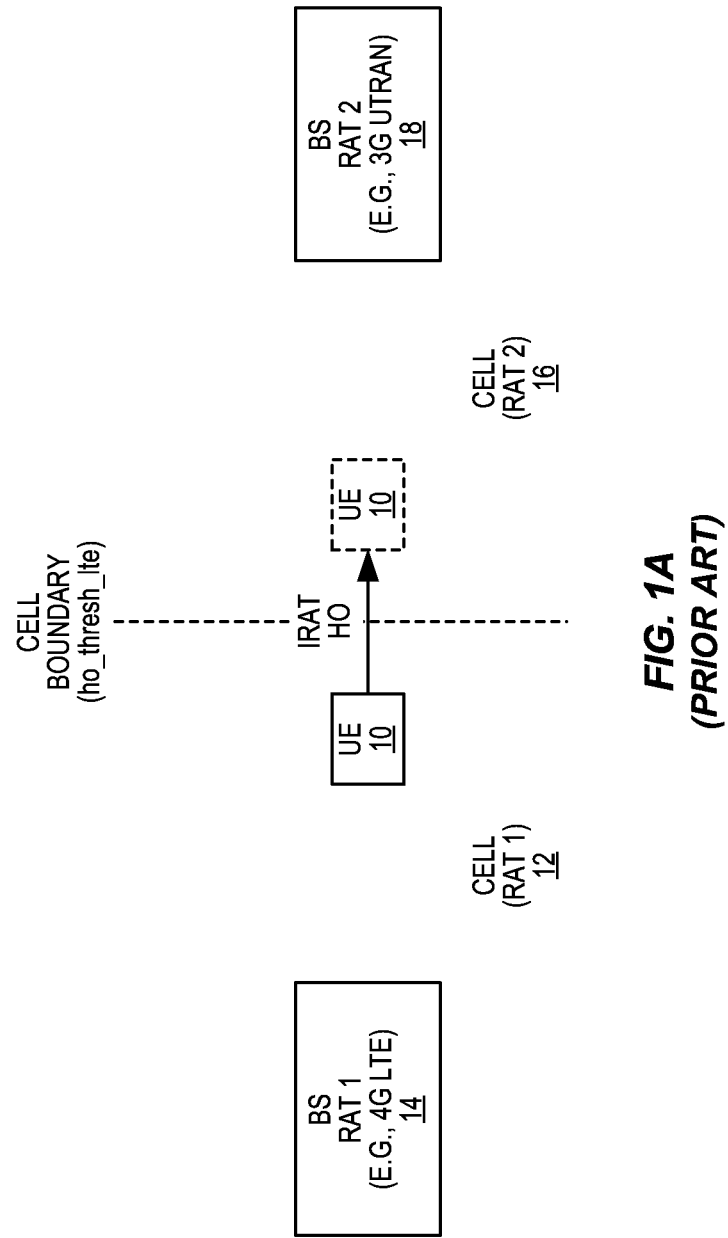
FIGS. 1A and 1B illustrate Inter-Radio Access Technology (IRAT) handovers (HOs) in a cellular communications network according to one embodiment of the present disclosure.
Figure 1B:
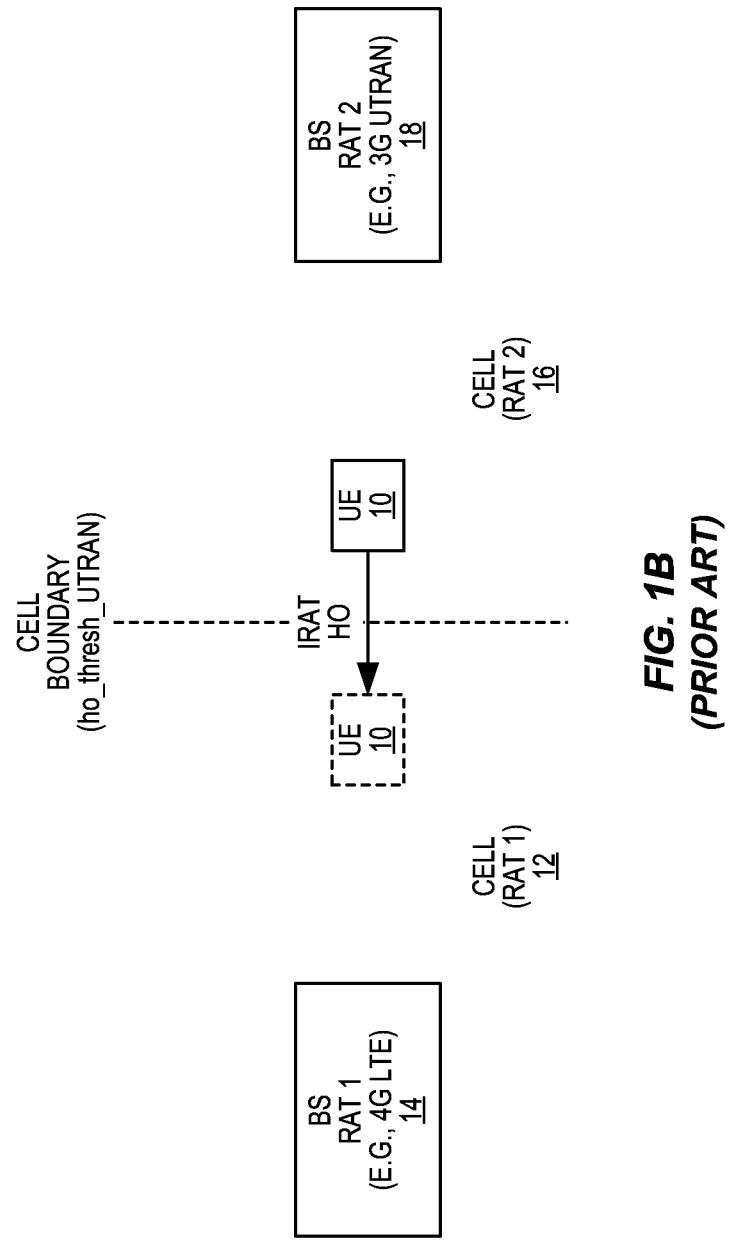
Figure 2:
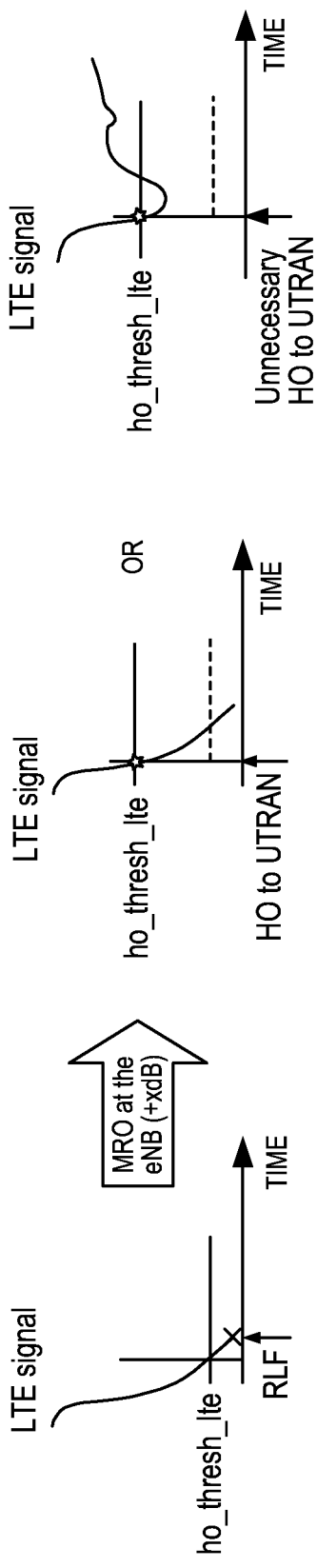
FIG. 2 illustrates a tradeoff between decreasing the number of Radio Link Failures (RLFs) due to too late IRAT HOs from a Long Term Evolution (LTE) Radio Access Network (RAN) to a Universal Terrestrial Radio Access Network (UTRAN) and increasing the number of unnecessary IRAT HOs from the LTE RAN to the UTRAN when increasing a corresponding IRAT HO threshold.
Figure 3:
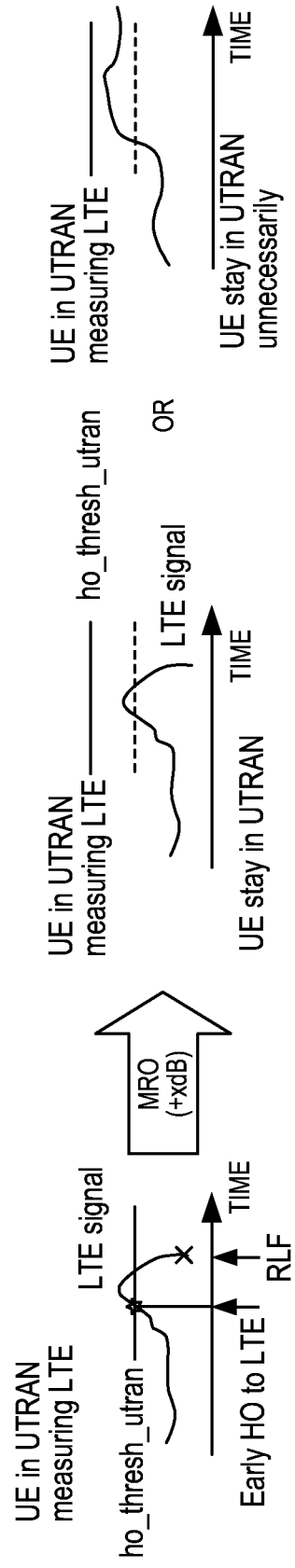
FIG. 3 illustrates a tradeoff between decreasing the number of HO Failures (HOFs) due to too early IRAT HOs from a UTRAN to an LTE RAN and unnecessarily increasing time in the UTRAN when increasing a corresponding IRAT HO threshold.
Figure 5:
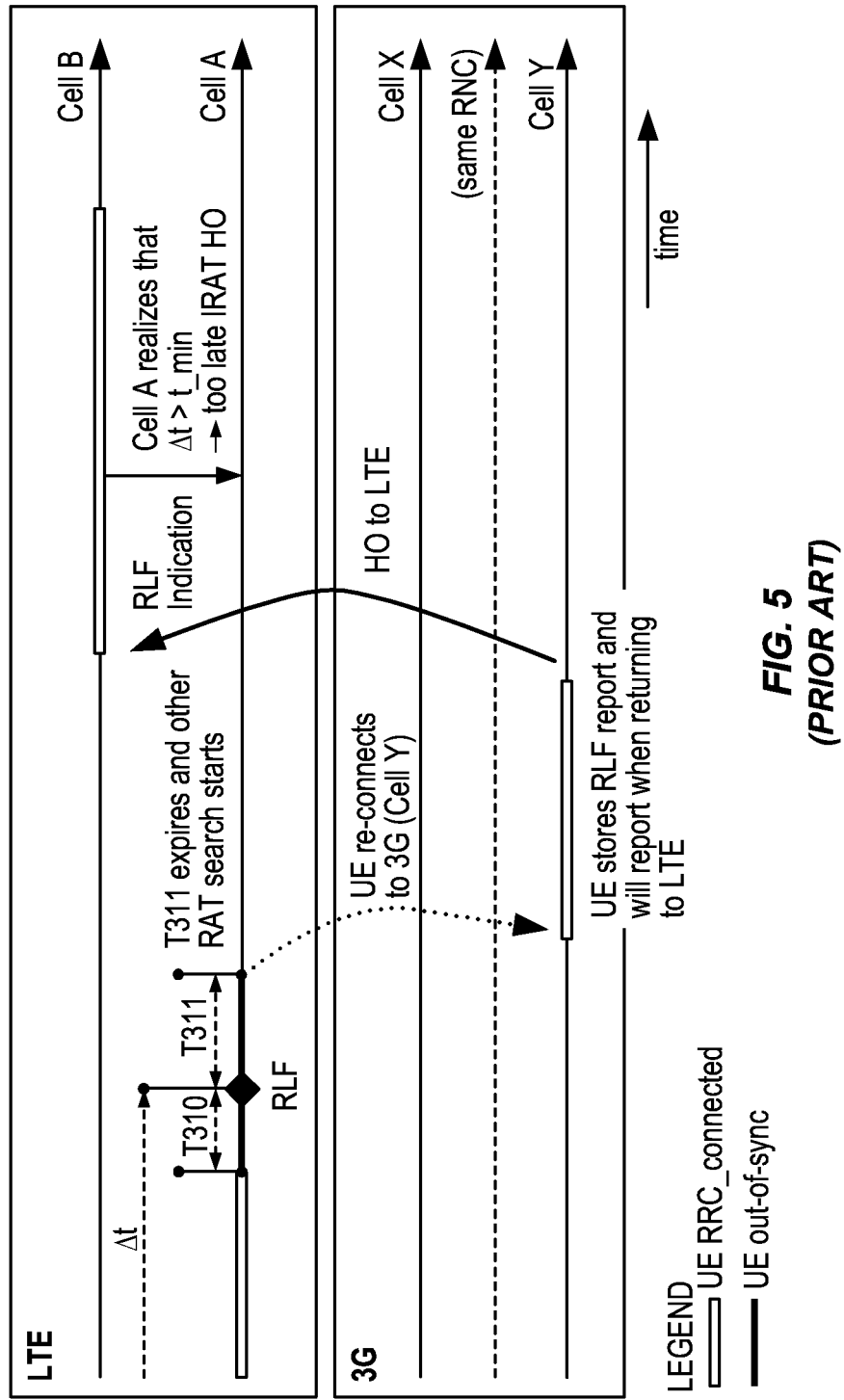
Figure 6:
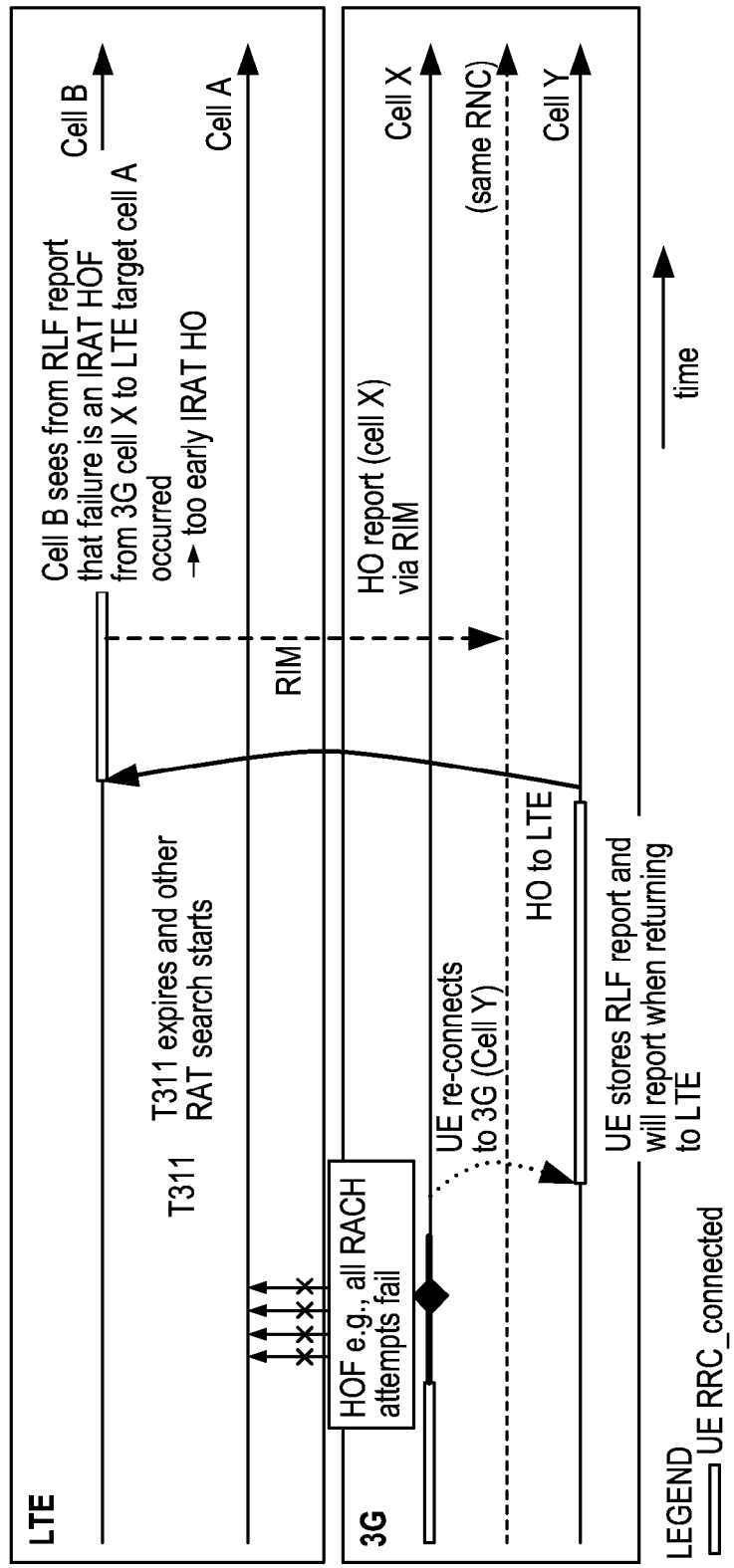
Figure 7:
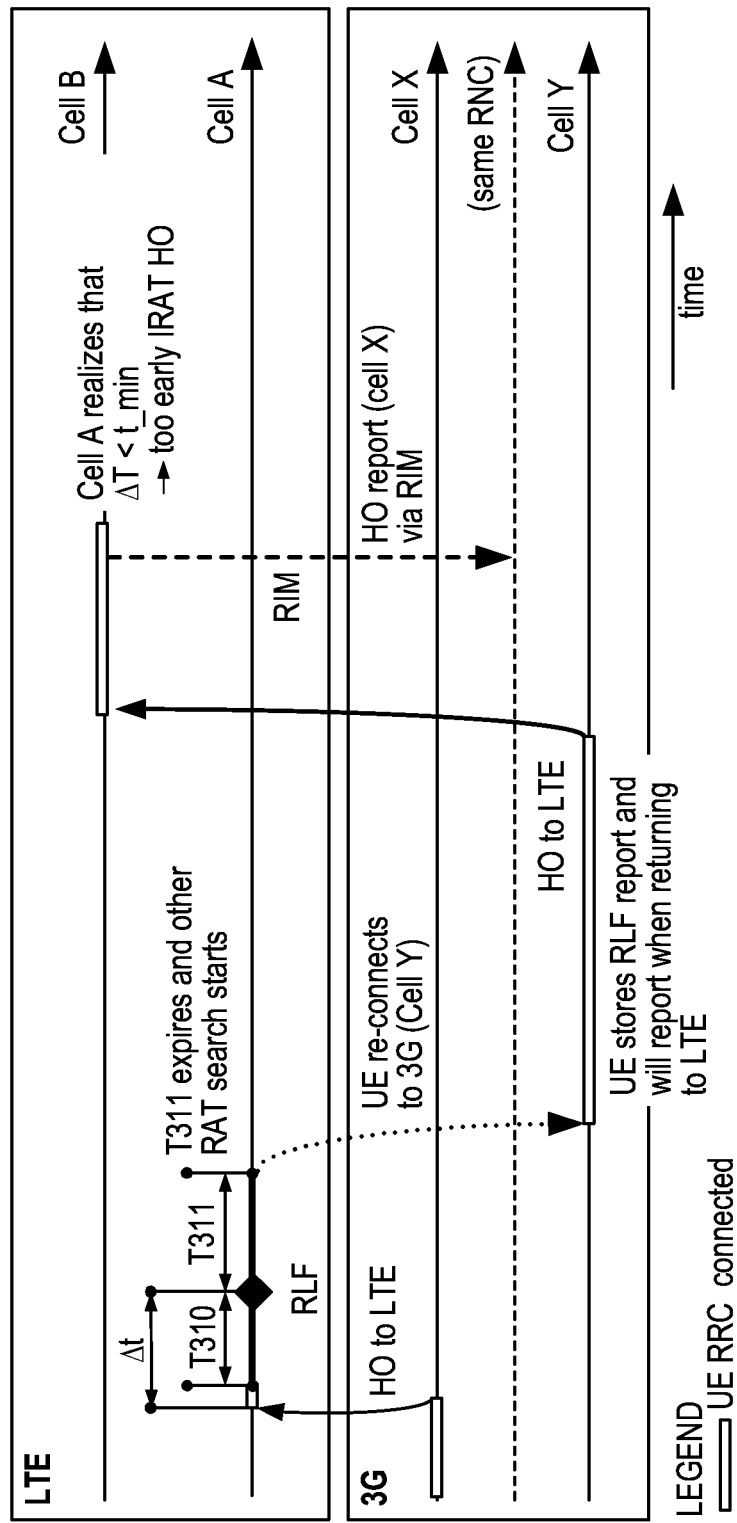
Figure 8:
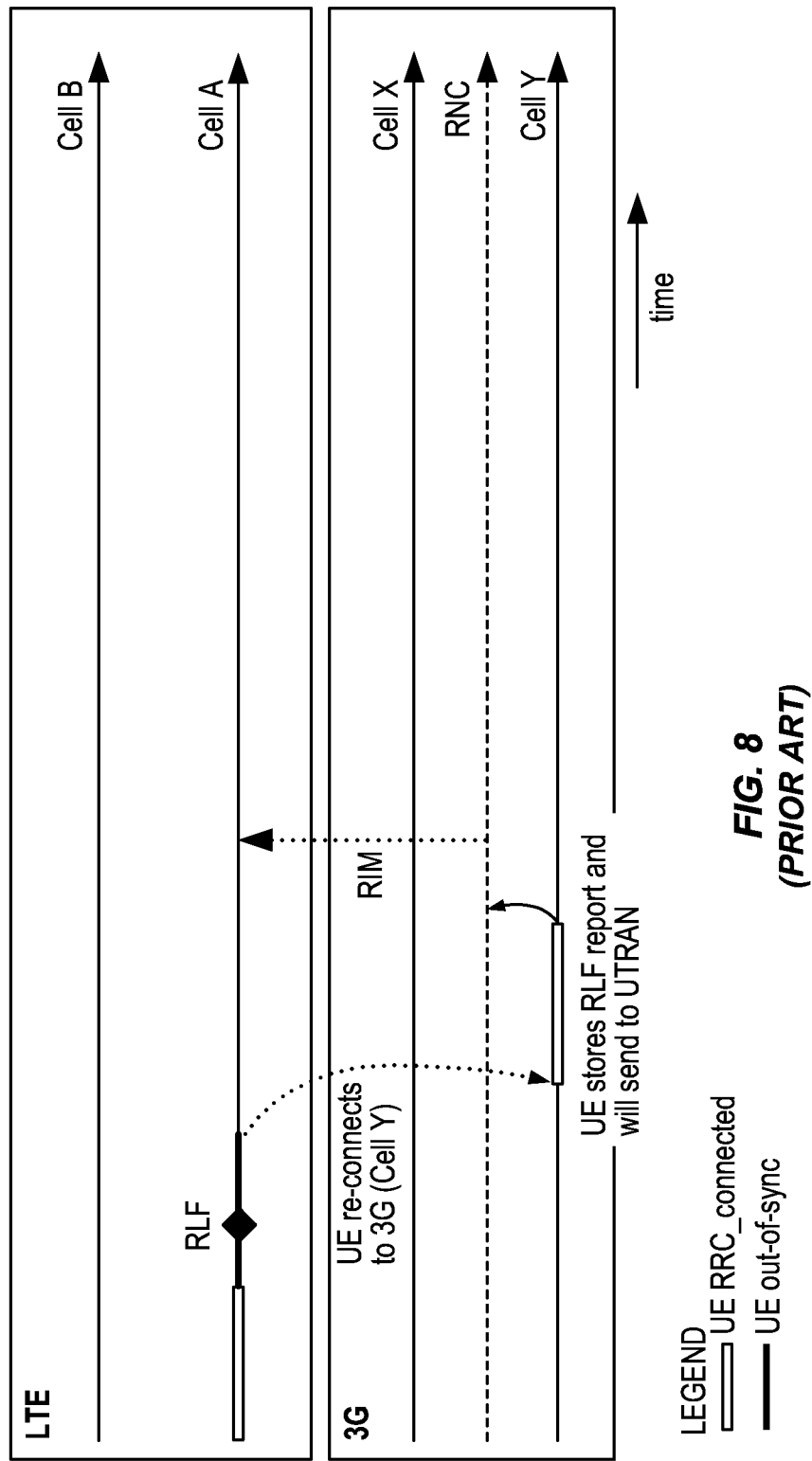
Figure 9:
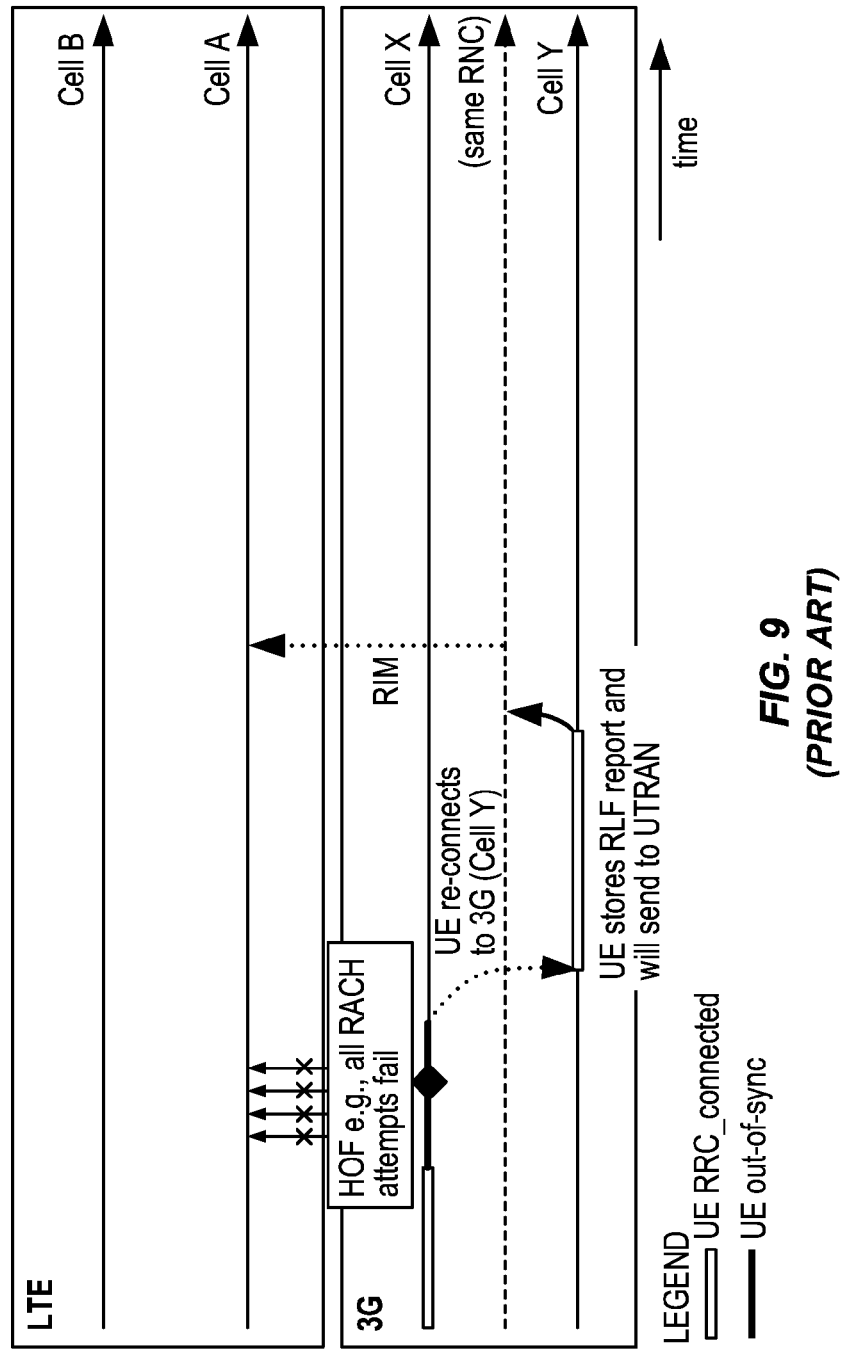
Figure 10:
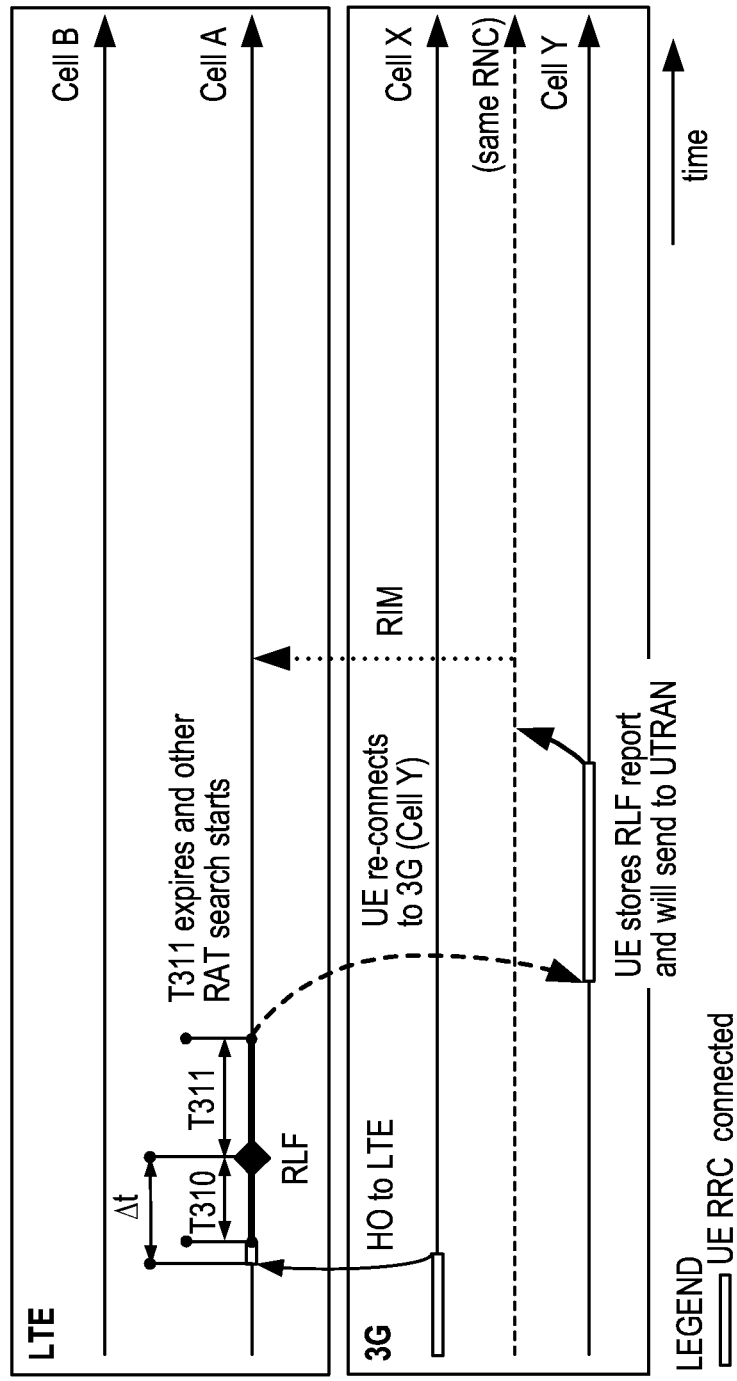
Figure 11:
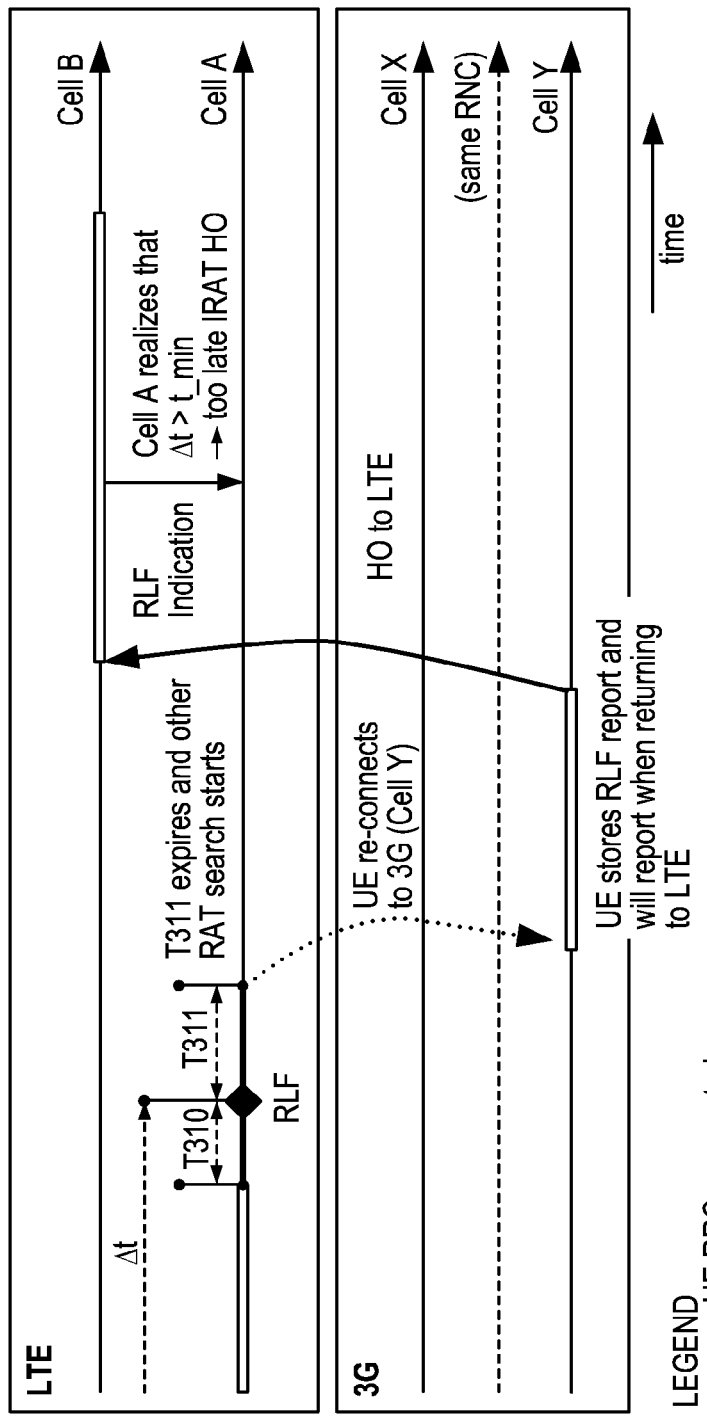
Figure 12:
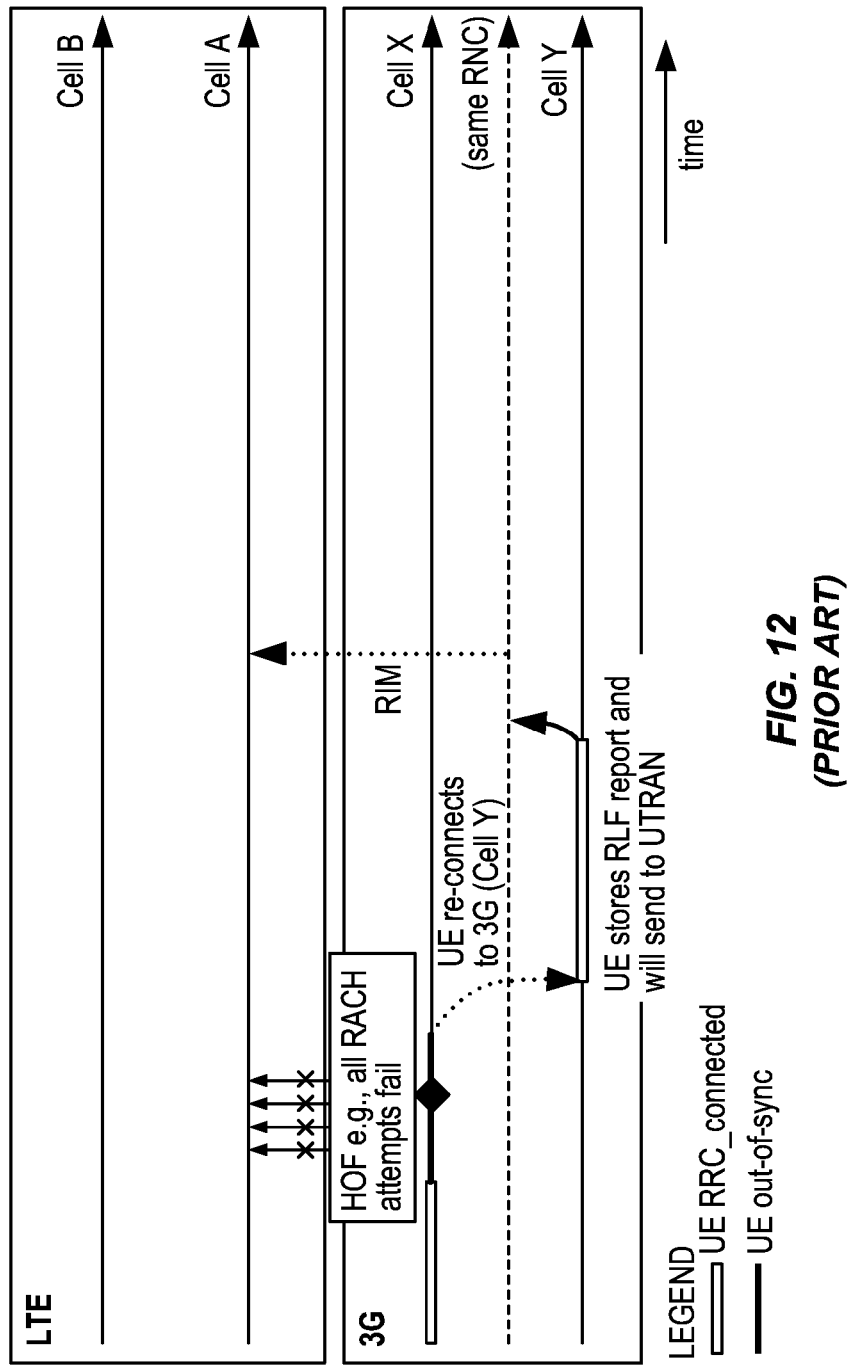
Figure 13:
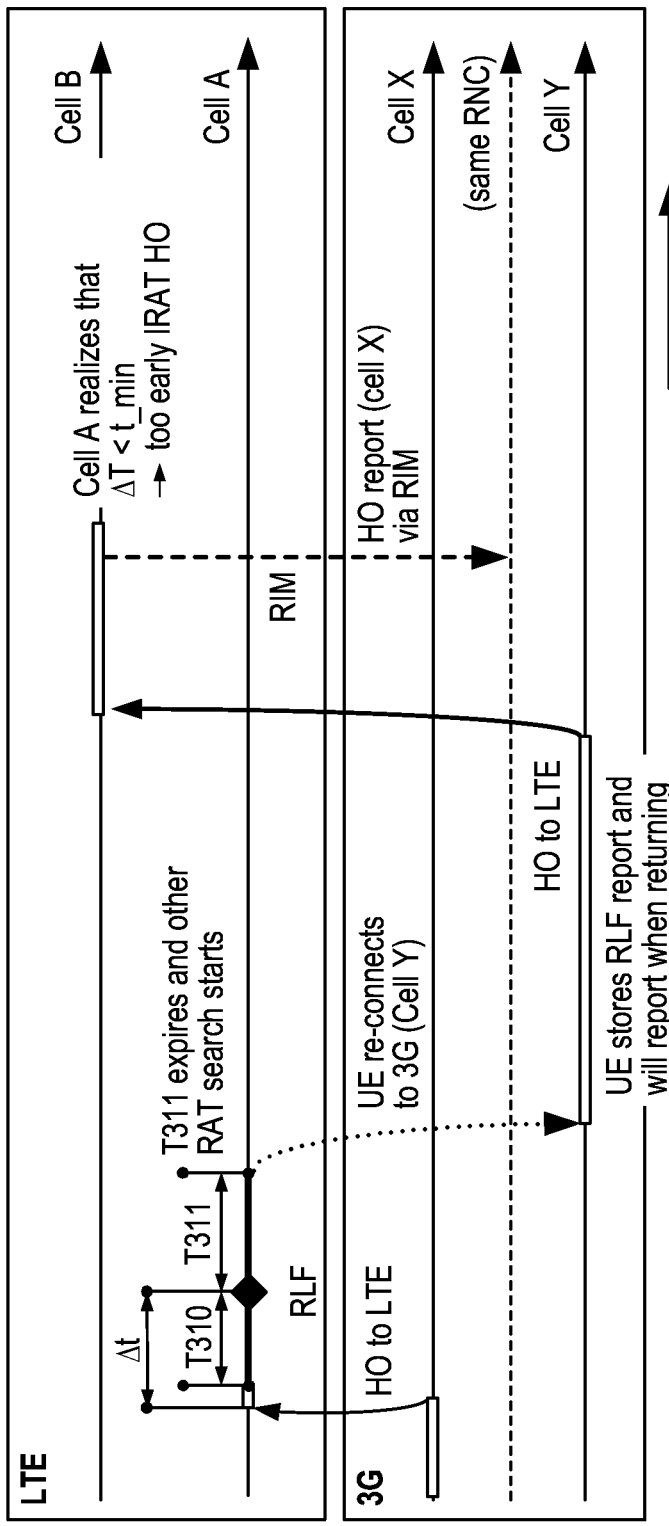
Figure 14:
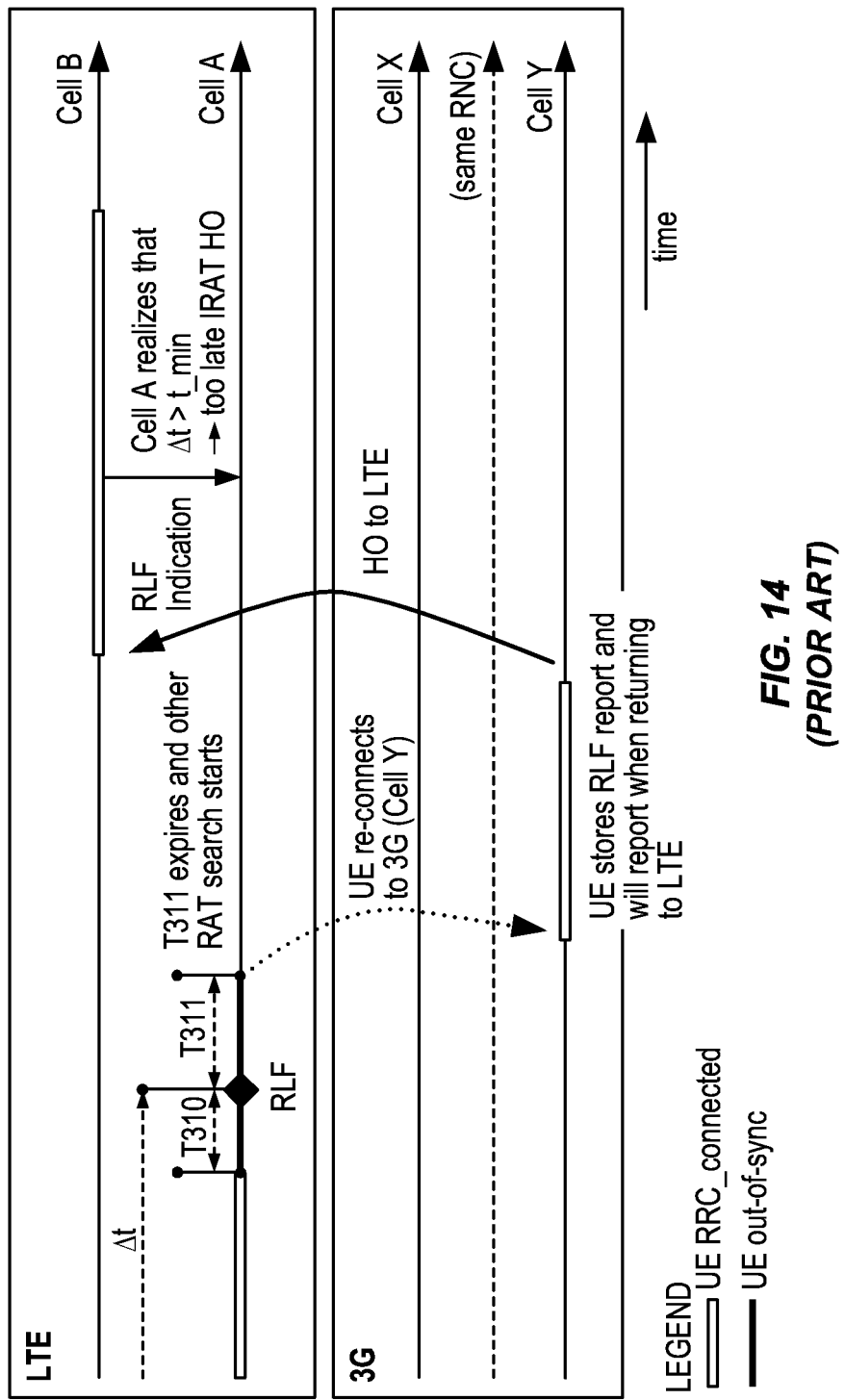
Figure 15:
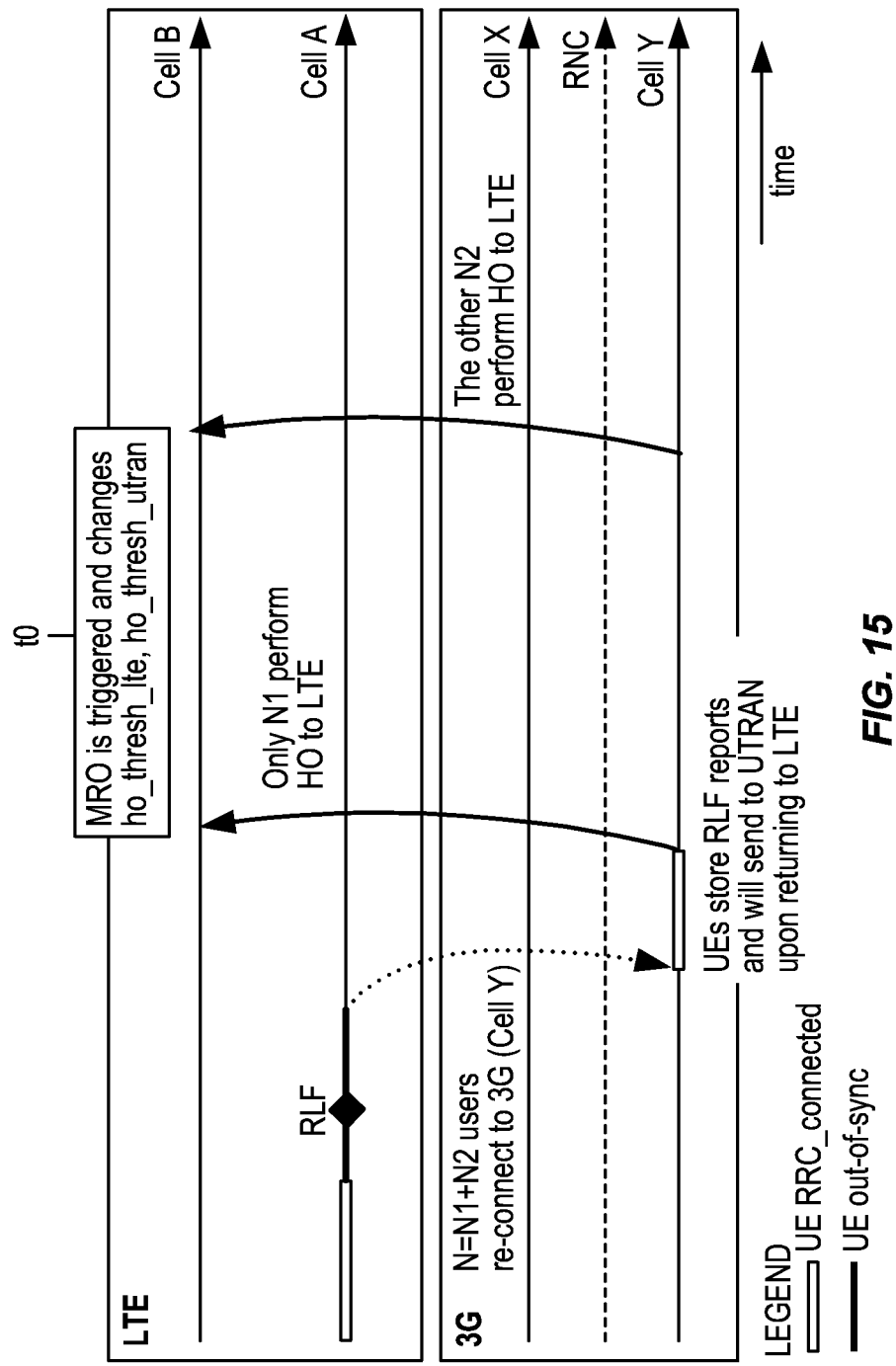
Figure 16:
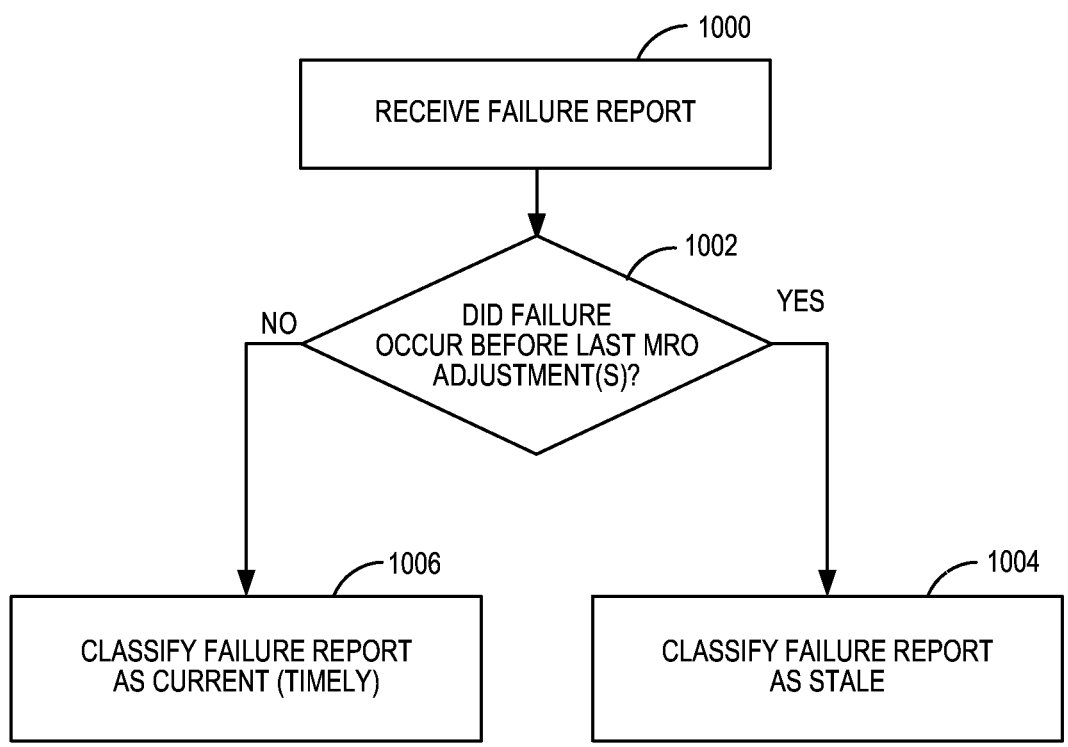
Figure 17:
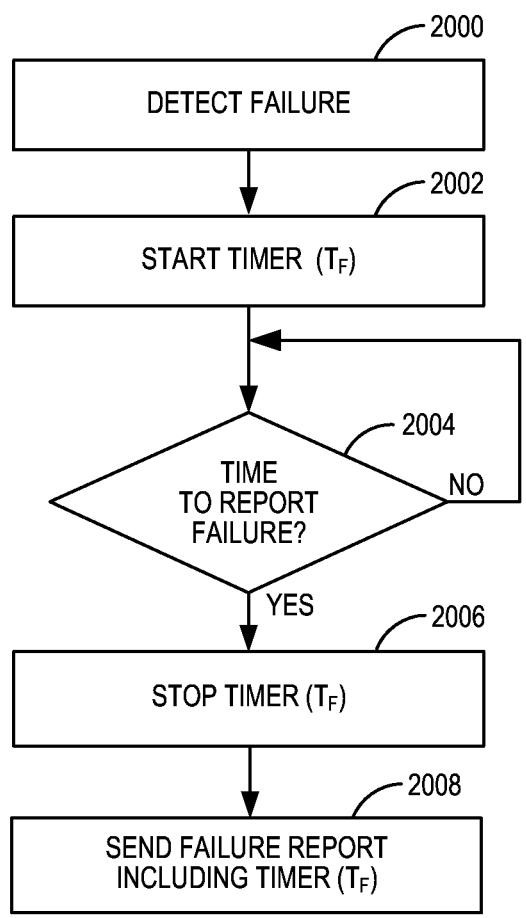
Figure 18:
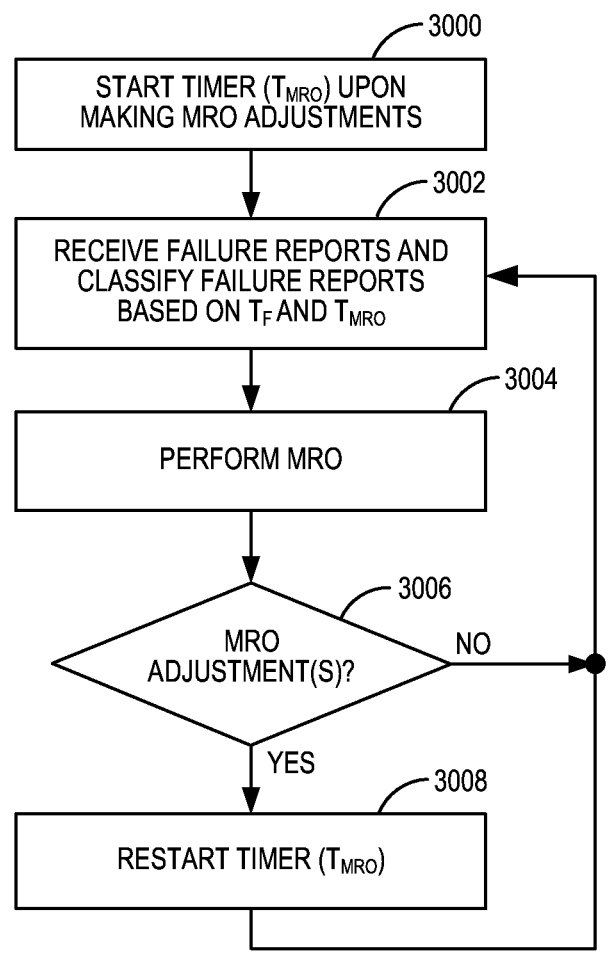
Figure 19:
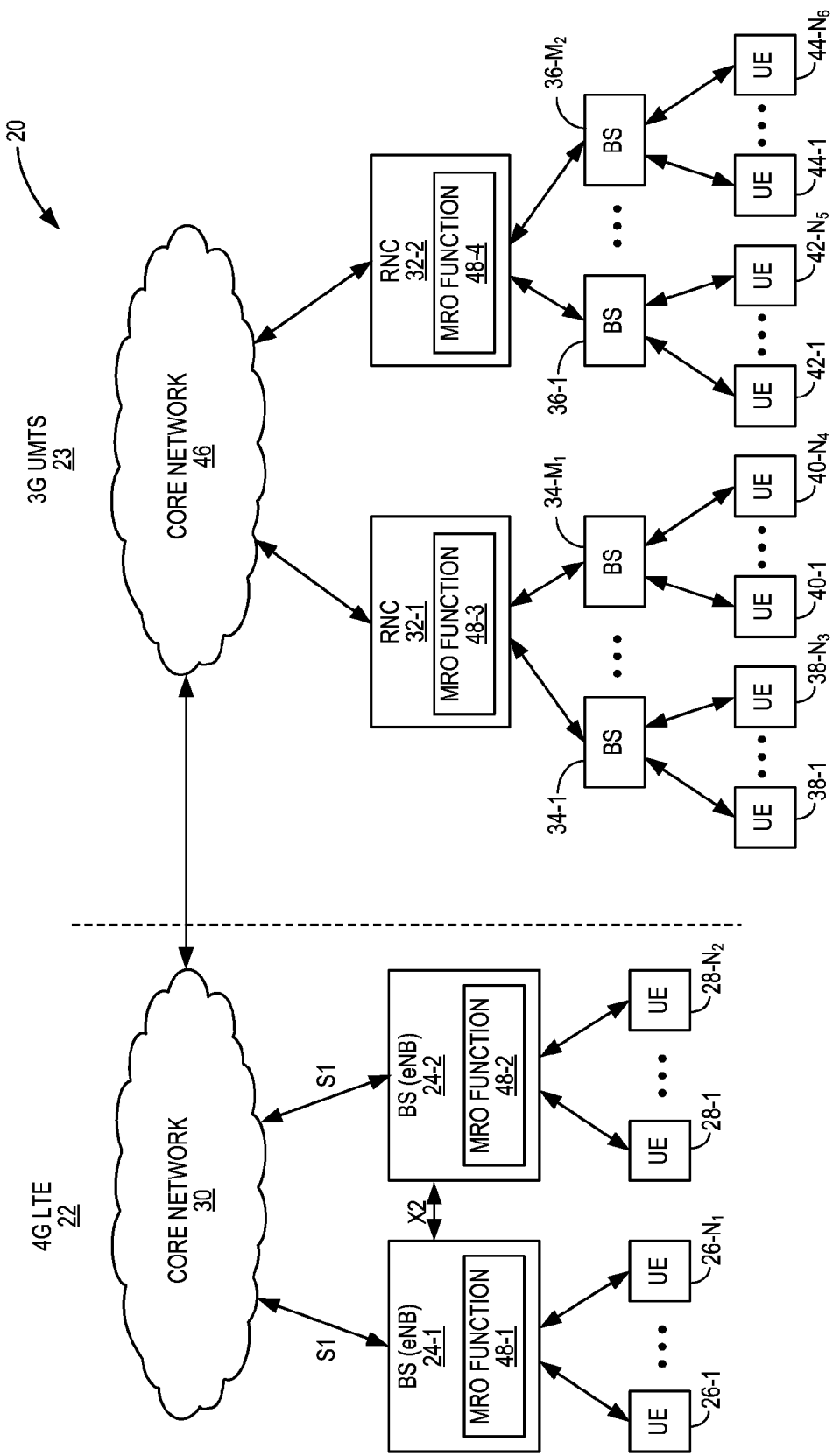
Figure 30:
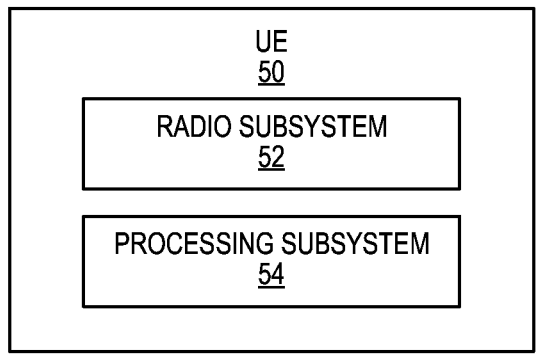
Figure 31:
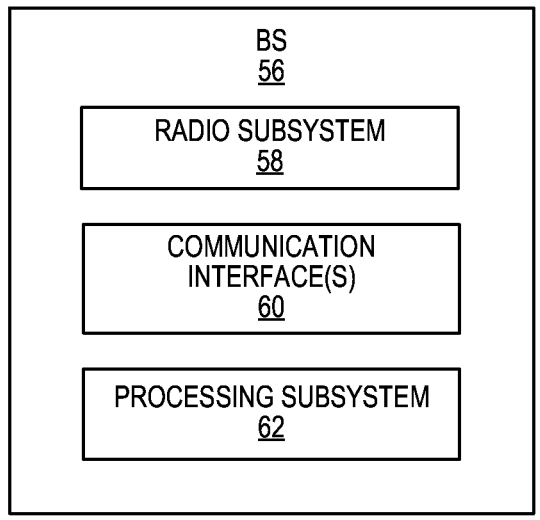
Figure 32:
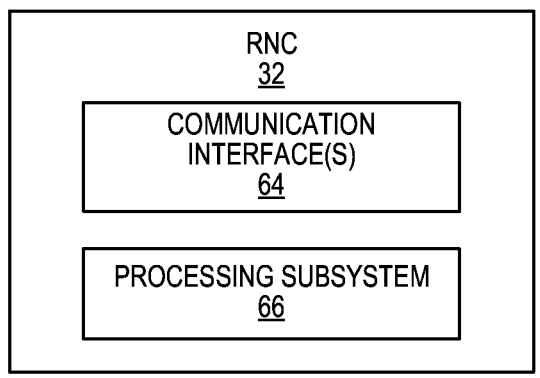

FIGS. 5 through 14 graphically illustrate four different solutions for sending failure reports to the cellular communications network for different scenarios of connection failures associated with IRAT HOs;

FIG. 15 illustrates late reporting of a connection failure to a node in a cellular communications network performing a Mobility Robustness Optimization (MRO) function, which can occur in many of the solutions and scenarios illustrated in FIGS. 5 through 14;

FIG. 16 is a flow chart that illustrates a process for classifying a failure report received by a node that performs an MRO function as either current or stale according to one embodiment of the present disclosure;

FIG. 17 is a flow chart that illustrates the operation of a User Equipment or User Element (UE) to send, or transmit, a failure report to a cellular communications network, where the failure report includes timing data that is indicative of a time at which an associated connection failure occurred according to one embodiment of the present disclosure;

FIG. 18 is a flow chart that illustrates the operation of a node in a cellular communications network that performs an MRO function to receive and classify failure reports based the timing data included in the failure reports according to the process of FIG. 17 as well as timing data that defines a time at which a most recent MRO adjustment was made by the node according to one embodiment of the present disclosure;

FIG. 19 illustrates a cellular communications network that includes a 4G LTE cellular communications network and a 3G Universal Mobile Telephony System (UMTS) cellular communications network in which IRAT HOs occur between an LTE RAN of the 4G LTE cellular communications network and a UTRAN of the UMTS cellular communications network, wherein failure reports transmitted by UEs for connection failures include timing data that is utilized by appropriate MRO functions to classify the failure reports as current or stale according to one embodiment of the present disclosure;

FIG. 20 through 29 illustrate transmission of failure reports for each of the solutions and scenarios of FIGS. 5 through 14 in which the failure reports including timing data that enable classification of the failure reports as either current or stale according to various embodiments of the present disclosure;

FIG. 30 is a block diagram of a UE according to one embodiment of the present disclosure;

FIG. 31 is a block diagram of a base station according to one embodiment of the present disclosure; and FIG. 32 is a block diagram of a Radio Network Controller (RNC) according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

As discussed in the Background, with respect to Inter-Radio Access Technology (IRAT) handovers (HOs) in a multiple Radio Access Technology (RAT) cellular communications system, $3^{rd}$ Generation Partnership Project (3GPP) Radio Access Network (RAN) Working Group 3 (WG3) has identified multiple high priority scenarios that present mobility issues and therefore need to be addressed. Again, the scenarios identified by 3GPP RAN WG3 are:

Scenario 1: A mobility connection failure (also referred to herein as simply a connection failure), specifically a Radio Link Failure (RLF), while in a Long Term Evolution (LTE) RAN or during a HO from the LTE RAN to a 2G/3G RAN (e.g., a Universal Terrestrial Radio Access Network (UTRAN)) followed by a reconnection to the 2G/3G RAN (i.e., a too late HO from an LTE RAN to a 2G/3G RAN).

Scenario 2: A mobility failure during or after a HO from a 2G/3G RAN (e.g., a UTRAN) to an LTE RAN followed by a reconnection back to the 2G/3G RAN (i.e., the source RAT). The reconnection may be to the source cell for the HO or a different cell in the 2G/3G RAN. This is referred to herein as a too early HO from a 2G/3G RAN to an LTE RAN.

Scenario 2a: A handover failure (HOF) during the HO from the 2G/3G RAN to the LTE RAN (i.e., a HOF during a Random Access Channel (RACH) attempt in the LTE RAN) followed by the reconnection back to the 2G/3G RAN.

Scenario 2b: An RLF in the LTE RAN shortly after the HO from the 2G/3G RAN to the LTE RAN (i.e., an RLF after successful RACH in the LTE RAN) followed by the reconnection back to the 2G/3G RAN.

Further, for IRAT HOs between an LTE RAN and a 2G/3G RAN, multiple solutions for making RLF reports associated with IRAT HOs available to the different RATs running Mobility Robustness Optimization (MRO) algorithms have been proposed. As discussed in the Background, these solutions include:

Solution 1: Reporting the RLF when returning to the LTE RAN.

Solution 2: Reporting the failure to the 2G/3G RAN and/or the LTE RAN where the UE reconnects after the mobility failure.

Solution 3: Reporting the RLF to the RAT where the failure occurred and reporting the HO failure in the RAT of the cell in which the HO command was received.

Solution 4: Reporting the RLF when returning to the LTE RAN in the case of a too late IRAT HO from the LTE RAN to the 2G/3G RAN and detecting the connection failure at the RNC of the 2G/3G RAN in the case of a too early IRAT HO from the 2G/3G RAN to the LTE RAN.

The inventors have found that, when using the solutions discussed above for making failure reports available to the cellular communications network, one issue that arises is that there may be delays between a time at which a User Equipment or User Element (UE) experiences a connection failure and a time at which the UE reports the connection failure. Delays in reporting the connection failure may be due to a long delay before the UE reconnects to the RAN where the connection failure is to be reported (e.g., Solution 1), due to the UE transitioning to an idle mode for a long time before reconnecting to the RAN where the connection failure is to be reported, or due to a failure of the cellular communications network to request reporting of the RLF report for a long time. Thus, an MRO function that performs MRO for a cell in, for example, an LTE RAN may perform an MRO process that results in adjustment(s) to mobility parameters (i.e., mobility adjustments) for the cell based on failure reports received in a timely manner. However, due to the issue of delayed reporting, the MRO function may continue to receive failure reports after the mobility adjustment(s) have been made where the failure reports are relevant to a time window prior to making the mobility adjustment(s). Using current MRO algorithms, these "stale" failure reports are still considered with the same relevance as timely failure reports for the next iteration of the MRO process. The stale failure reports may lead to incorrect or undesirable mobility adjustments and slow convergence of the cellular communications network to a state of stable mobility.

As an example, FIG. 15 illustrates stale failure reports for Solution 1, Scenario 1 after RLFs due to too late HOs from an LTE RAN to a 3G RAN. For Solution 1, UEs do not report failures until they return to the LTE RAN and, as a result, there is a delay if the UEs do not initially reconnect back to the LTE RAN after the RLF. This delay may be quite long due to two reasons: (1) the HO from the 3G RAN to the LTE RAN may be disabled by operators in order to avoid ping pongs between the LTE RAN and the 3G RAN and (2) UEs reconnect to the LTE RAN via cell reselection, which is a UE controlled procedure (i.e., the UEs may decide to stay camped in the 3G RAN if desired). It is very likely that MRO functions running on the base stations in the LTE RAN and/or MRO functions running on Radio Network Controllers (RNCs) in the 3G RAN will trigger mobility adjustments periodically in response to some event occurrence and/or based on reception of a minimum number of reports, which can be RLF reports, unnecessary HO reports, or ping pong reports.

In this example, N=N1+N2 UEs have suffered too late HOs from Cell A of the LTE RAN to Cell X of the 3G RAN and all N of the UEs reconnected to Cell Y of the 3G RAN after the corresponding RLFs in Cell A of the LTE RAN due to the too late HOs. After some time, N1 of the UEs have reconnected to Cell B of the LTE RAN and transmitted corresponding RLF reports to a base station (eNB 1) corresponding to Cell B in the LTE RAN. Assuming that eNB 1 serves both Cell A and Cell B of the LTE RAN, an MRO process of the eNB 1 is triggered at a certain time (t0) to determine whether mobility adjustments, or MRO adjustments, are needed and, if so, make the mobility adjustments. After the time (t0), new UEs may eventually suffer from too late or unnecessary HOs and, when those new UEs return to the LTE RAN, the new UEs send new RLF reports to be used for a next iteration of the MRO process.

After the time (t0), eNB1 will also receive RLF reports from the other N2 UEs if those UEs send RLF reports to the LTE RAN within 48 hours after the failure according to 3GPP Technical Specification (TS) 36.331. In the current standard, there is no support for eNB 1 to recognize that the RLF reports from those N2 UEs are not associated with the current mobility parameter settings in eNB 1. Therefore, it is not possible for eNB 1 to discard the RLF reports from the N2 UEs such that the RLF reports are not considered for the subsequent iteration of the MRO process at eNB 1. As such, the RLF reports from the N2 UEs, which are referred to herein as stale RLF reports, will impact the robustness of the MRO adjustments and the MRO convergence proportionally to N2/N.

In the other Solutions, i.e., Solutions 2, 3, and 4, RLF reports are made available to other nodes which possibly run MRO algorithms. In these solutions, a stale RLF may occur, for example, if a UE goes to idle mode after the failure and returns to active mode after a long time or if the network fails to request reporting of the RLF report for a long time. The problem of stale RLF reports will also exist even if the RLF reports are available faster than in Solution 1. For example, it can be assumed that a certain number of failures occur minutes before an iteration of the MRO process is performed and, even though corresponding RLF reports are available minutes later, the RLF reports are stale.

The present disclosure provides systems and methods that address stale reporting of connection failures in a cellular communication network. Stale failure reports can be discarded such that they are not considered for a subsequent iteration of a mobility optimization process (e.g., an MRO process) or considered for the subsequent iteration of the mobility optimization process but with reduced relevance. Notably, while many of the embodiments described below relate to classification of failure reports with respect to IRAT HOs, the concepts disclosed herein are equally applicable to failure reports for intra-RAT HOs (i.e., HOs between cells in the same RAT). Further, although many of the embodiments discussed below relate to classification of failure reports with respect to IRAT HOs between a 4G LTE cellular communications network and a 2G/3G cellular communications network, the concepts described herein are not limited to any particular RATs.

In this regard, FIG. 16 is a flow chart that illustrates a process for characterizing a failure report according to one embodiment of the present disclosure. In this embodiment, the process of FIG. 16 is performed by a node in a cellular communications network that performs a process for adjusting, or updating, mobility parameters, which is referred to herein as an MRO process. As used herein, a mobility parameter is a parameter utilized to control mobility, or HOs, of a wireless device, or UE, within a cellular communications network (e.g., a Reference Signal Received Power (RSRP) or Reference Signal Received Quality (RSRQ) threshold). More specifically, a mobility parameter is a parameter utilized to control HOs from one cell to a neighboring cell, where the two cells may be in the same RAN (i.e., for intra-RAT HOs) or in different RANs operating according to different RATs (i.e., for IRAT HOs). Mobility parameters generally include mobility thresholds (e.g., RSRP and/or RSRQ thresholds). A mobility adjustment is an adjustment of one or more mobility parameters for a specific neighboring cell. Further, the mobility adjustment may affect mobility parameters such as mobility thresholds between different source and target entities. For example, the mobility adjustment may be applied between a source cell to a target cell or between a source cell to a target frequency or between a source cell to a target RAT. The node that performs the process of FIG. 16 can be, for example, a base station in the cellular communications network (e.g., an enhanced Node B (eNB) of an LTE cellular communications network), an RNC (e.g., an RNC of a base station in a Universal Mobile Telecommunications System (UMTS) cellular communications network), or the like.

As illustrated, the node receives a failure report associated with a connection failure for a UE (step 1000). As used herein, a failure report is generally information that notifies or reports a connection failure experienced by the UE, where the connection failure is more specifically a mobility connection failure. In one particular embodiment, the failure report is an RLF report. As discussed below, the failure report includes timing data that is indicative of a time at which the connection failure occurred. In one preferred embodiment, the timing data is or includes a timer value that defines an amount of time that has expired between the time at which the connection failure occurred and a time at which the UE reported the connection failure by transmitting the failure report to an appropriate node. However, the timing data is not limited thereto. For example, the timing data may alternatively include an absolute time at which the connection failure occurred (e.g., a time and date at which the connection failure occurred). As discussed below in detail, the manner in which the node receives the failure report can vary depending on the particular embodiment. In general, the node can receive the failure report from the UE, from another node in the same cellular communications network, or from another node in another cellular communications network operating according to a different RAT.

After receiving the failure report, the node determines whether the associated connection failure occurred before a last, or most-recent, MRO adjustment made by the node (step 1002). In other words, the node determines when the associated connection failure occurred with respect to the most recent MRO adjustment(s) made by the node. More specifically, in one embodiment, the timing data included in the failure report includes timing data that is indicative of a time at which the connection failure occurred. The node then determines when the associated connection failure occurred with respect to the most recent MRO adjustment(s) based on the timing data in the failure report and timing data maintained by the node that defines a time at which the most recent MRO adjustment(s) was made by the node. In one preferred embodiment discussed below, the timing data in the failure report is or includes a timer value that defines an amount of time that has expired between a time at which the connection failure occurred and a time at which the UE reported the connection failure by transmitting the failure report to the appropriate node, and the timing data maintained by the node is or includes another timer value that defines an amount of time that has expired since the most recent MRO adjustment(s) was made by the node. In this embodiment, the node determines when the connection failure occurred with respect to the most recent MRO adjustment(s) made by the node based on a comparison of the two timer values while, in some embodiments, accounting for any delay between the reporting of the connection failure by the UE and reception of the failure report by the node.

In another embodiment, another node (e.g., an Operations and Maintenance (OAM) node) maintains the timer value that defines the amount of time that has expired since the most recent MRO adjustment(s) was made by the node. In this embodiment, the node sends the timer value from the failure report that defines the amount of time that expired between the time at which the connection failure occurred and the time at which the UE reported the connection failure by transmitting the failure report to the other node. The other node then compares the two timer values while, in some embodiments, accounting for any delay between the reporting of the connection failure by the UE and reception of the timer value in the failure report sent by the other node. The other node then returns information to the node that is indicative of when the connection failure occurred with respect to the most recent MRO adjustment(s) made by the node.

If the connection failure occurred before the most recent MRO adjustment(s), the node classifies the failure report as a stale failure report (step 1004). As such, in one embodiment, the failure report is discarded or otherwise not considered for a next iteration of the MRO process. In another embodiment, the failure report is considered for the next iteration of the MRO process with reduced relevance (e.g., reduced weighting or scaling factor as compared to timely failure reports for the next iteration of the MRO process). If the connection failure occurred after the most recent MRO adjustment(s), the node classifies the failure report as a current, or timely, failure report (step 1006). As such, the failure report is considered with full weight for the next iteration of the MRO process.

FIG. 17 is a flow chart that illustrates the operation of a UE to report a connection failure according to one embodiment of the present disclosure. As illustrated, the UE detects a connection failure (step 2000). The connection failure is preferably either an RLF or a HOF. For example, the connection failure may be an RLF due to a too late IRAT HO from an LTE RAN to a 2G/3G RAN. As another example, the connection failure may be a HOF due to a too early IRAT HO from a 2G/3G RAN to an LTE RAN or an RLF shortly after an IRAT HO from a 2G/3G RAN to an LTE RAN due to a too early IRAT HO. Note, however, that these examples are non-limiting. Other types of connection failures (i.e., HO failures for an intra-RAT HO) may be detected, and subsequently reported, by the UE.

In response to detecting the connection failure, the UE starts a timer, which is referred to herein as timer ($T_F$) (step 2002). Thereafter, the UE continues to run the timer ($T_F$) until the UE determines that it is time to report the connection failure (step 2004). Once it is time to report the connection failure, the UE stops the timer ($T_F$) (step 2006). In this manner, the timer ($T_F$) defines an amount of time that has expired between a time at which the connection failure occurred and therefore detected by the UE and a time at which the connection failure is reported by the UE. Lastly, the UE sends, or transmits, a failure report that reports the connection failure to an appropriate node where the failure report includes the value of the timer ($T_F$) (step 2008). The node to which the UE sends the failure report can vary depending on the particular embodiment. As discussed below in detail, the UE can send the failure report to a base station in the same RAT, or same RAN, in which the connection failure occurred or a base station in a different RAT, or different RAN, than the RAT, or RAN, in which the connection failure occurred. Notably, whether the connection failure is an RLF or a HOF, the connection failure is reported via an RLF report.

FIG. 18 is a flow chart that illustrates the operation of a node that performs an MRO process to receive, classify, and utilize failure reports sent by UEs according to the process of FIG. 17 according to one embodiment of the present disclosure. As illustrated, the node starts a timer ($T_{MRO}$) upon making MRO adjustment(s) for a first iteration of the MRO process (step 3000). Thereafter, the node receives failure reports and classifies the failure reports based on the timer ($T_{MRO}$) and the timer ($T_F$) included in the failure reports (step 3002). Note that the failure reports can be failure reports for multiple cells, frequencies, and/or RATs. In one embodiment, each failure report is classified based on a comparison of the timer ($T_{MRO}$) at the time that the failure report is received by the node and the timer ($T_F$) in the failure report such that the failure report is classified as a stale failure report if $T_F > T_{MRO}$ and classified as a current, or timely, failure report if $T_F < T_{MRO}$. Note, however, that in some embodiments there may be a delay between the time at which the failure report is sent by the corresponding UE and the time at which the failure report is received by the node. For example, in Solution 1, Scenario 2a, the failure report is sent by the UE to the 2G/3G RAN and then forwarded by an RNC of the 2G/3G RAN to the LTE RAN via RAN Information Message (RIM). The forwarding of the failure report has an associated delay, which may be compensated for by the node when comparing $T_F$ and $T_{MRO}$.

At some time after a triggering event for performing the MRO process has occurred, the node performs a next iteration of the MRO process (step 3004). In one embodiment, stale failure reports are discarded such that the next iteration of the MRO process performed in step 3004 is performed based on the failure reports received and classified as current in step 3002 but not based on the failure reports received and classified as stale in step 3002. In another embodiment, stale failure reports are considered but with reduced relevance such that the next iteration of the MRO process performed in step 3004 is performed based on the failure reports received and classified as current in step 3002 as well as the failure reports received and classified as stale in step 3002 but where the stale failure reports are considered with reduced relevance compared to the current failure reports. The relevance of the stale failure reports may be reduced by, for example, applying a suitable scaling or weighting factor to the stale failure reports.

Next, the node determines whether any MRO adjustments were made during the iteration of the MRO process performed in step 3004 (step 3006). If not, the process returns to step 3002 and continues. If one or more MRO adjustments were made in step 3004, the node restarts the timer ($T_{MRO}$) (step 3008) and then the process returns to step 3002 and continues.

FIG. 19 illustrate a multiple RAT cellular communications system 20 that enables reporting of connection failures and classification of corresponding failure reports according to one embodiment of the present disclosure. As used herein, a multiple RAT cellular communications system includes multiple cellular communications networks that operate according to different RATs. In this embodiment, the multiple RAT cellular communications system 20 includes an LTE cellular communications network 22 (specifically a 4G LTE cellular communications network 22) and a UMTS cellular communications network 23, which is a 3G network. As illustrated, the LTE cellular communications network 22 includes a RAN, which is referred to herein as an LTE RAN. The LTE RAN includes base stations (BSs) 24-1 and 24-2 (more generally referred to herein collectively as base stations 24 and individually as base station 24) that serve corresponding cells of the LTE cellular communications network 22. Notably, in LTE, the base stations 24 are also referred to as eNBs.

The base station 24-1 serves UEs 26-1 through 26-$N_1$ (more generally referred to herein collectively as UEs 26 and individually as UE 26) located within the cell served by the base station 24-1. Likewise, the base station 24-2 serves UEs 28-1 through 28-$N_2$ (more generally referred to herein collectively as UEs 28 and individually as UE 28) located within the cell served by the base station 24-2. It should be noted that, as used herein, a UE is any type of device configured to operate in a cellular communications network and, in the embodiment of FIG. 19, any type of device configured to operate in the multiple RAT cellular communications system 20. The base station 24-1 is referred to herein as a serving base station 24-1 of the UEs 26, and the base station 24-2 is referred to herein as a serving base station 24-2 of the UEs 28. Notably, while only two base stations 24-1 and 24-2 are illustrated in FIG. 19 for clarity and ease of discussion, it will be readily appreciated that the LTE cellular communications network 22 can include any number of base stations 24. Further, while not illustrated, each base station 24 may serve one or many cells or sectors.

The LTE cellular communications network 22 also includes a core network 30 that includes one or more Serving Gateways (S-GWs) and one or more Mobility Management Entities (MMEs) (not shown). The base stations 24 are connected to the core network 30 via corresponding S1 connections. Similarly, in this embodiment, the base stations 24-1 and 24-2 are connected to one another via an X2 connection.

The UMTS cellular communications network 23 includes a RAN, which is referred to herein as a UTRAN. The UTRAN includes RNCs 32-1 and 32-2 (more generally referred to herein collectively as RNCs 32 and individually as RNC 32). The RNC 32-1 controls a number of base stations 34-1 through 34-$M_1$ (more generally referred to herein collectively as base stations 34 and individually as base station 34). Likewise, the RNC 32-2 controls a number of base stations 36-1 through 36-$M_2$ (more generally referred to herein collectively as base stations 36 and individually as base station 36). The base station 34-1 serves UEs 38-1 through 38-$N_3$ (more generally referred to herein collectively as UEs 38 and individually as UE 38) located within a corresponding cell of the UMTS cellular communications network 23, and the base station 34-M$_1$ serves UEs 40-1 through 40-N$_4$ (more generally referred to herein collectively as UEs 40 and individually as UE 40) located within a corresponding cell of the UMTS cellular communications network 23. In the same manner, the base station 36-1 serves UEs 42-1 through 42-N$_5$ (more generally referred to herein collectively as UEs 42 and individually as UE 42) located within a corresponding cell of the UMTS cellular communications network 23, and the base station 36-M$_2$ serves UEs 44-1 through 44-N$_6$ (more generally referred to herein collectively as UEs 44 and individually as UE 44) located within a corresponding cell of the UMTS cellular communications network 23. Notably, while only two RNCs 32 are illustrated in FIG. 19 for clarity and ease of discussion, it will be readily appreciated that the UMTS cellular communications network 23 can include any number of RNCs 32 and associated base stations. The UMTS cellular communications network 23 also includes a core network 46. The RNCs 32 are connected to the core network 46 via corresponding connections.

The multiple RAT cellular communications system 20 includes multiple MRO functions 48-1 through 48-4 (more generally referred to herein collectively as MRO functions 48 and individually as MRO function 48) that operate to optimize mobility parameters for the UEs 26, 28, 38, 40, 42, 44. In the LTE cellular communications network 22, the MRO functions 48-1 and 48-2 are implemented at, in this example, the base stations 24-1 and 24-2. Conversely, in the UMTS cellular communications network 23, the MRO functions 48-3 and 48-4 are implemented at the RNCs 32-1 and 32-2. In this embodiment, the MRO function 48-1 performs an MRO algorithm to adjust, or update, one or more mobility parameters that control HOs from the cell(s) served by the base station 24-1. These mobility parameters can be associated with RSRP and/or RSRQ measurement types and operate to form a HO threshold for the cell(s) served by the base station 24-1, which is referred to herein as ho_thresh_lte. In the same manner, the MRO function 48-2 performs an MRO algorithm to adjust, or update, one or more mobility parameters that control HOs from the cell(s) served by the base station 24-2. The MRO function 48-3 performs an MRO algorithm to adjust, or update, one or more mobility parameters that control HOs from the cells served by the base stations 34 controlled by the RNC 32-1. These mobility parameters can be associated with RSRP and/or RSRQ measurement types and operate to form a HO threshold for the cell(s) served by the base station(s) 34, which is referred to herein as ho_thresh_utran. In the same manner, the MRO function 48-4 performs an MRO algorithm to adjust, or update, one or more mobility parameters that control HOs from the cells served by the base stations 36 controlled by the RNC 32-2.

As discussed below in detail, the MRO functions 48 classify failure reports associated with connection failures experienced by the UEs 26, 28, 38, 40, 42, and 44 as either stale or current for a particular iteration of the MRO algorithms performed by the MRO functions 48. In one embodiment, each failure report includes timing data that is indicative of a time at which the corresponding connection failures occurred. Once the failure report is received by the appropriate MRO function 48, the MRO function 48 then classifies the failure report as either current or stale based on the timing data as discussed above with respect to FIGS. 16-18. If the failure report is stale, then the MRO function 48 either discards the failure report or considers the failure report with reduced relevance for the next iteration of the MRO process, depending on the particular embodiment.

FIGS. 20-29 illustrate the operation of the multiple RAT cellular communications system 20 of FIG. 19 according to several embodiments of the present disclosure. In particular, FIGS. 20-29 illustrate the operation of the multiple RAT cellular communications system 20 of FIG. 19 for Solutions 1-4 and Scenarios 1, 2a, and 2b. In particular, FIG. 20 illustrates the operation of the multiple RAT cellular communications system 20 of FIG. 19 for Solution 1, Scenario 1 according to one embodiment of the present disclosure. As illustrated, at a time (t0), the MRO function 48 of the base station 24 (eNB) in the LTE RAN performs an iteration of the MRO process that results in one or more MRO adjustments (i.e., adjustments to one or more mobility parameters). As a result of making the MRO adjustments, the base station 24 (eNB) starts a timer (T$_{MRO}$). Sometime thereafter, at a time (t1), two UEs (UE1 and UE2) in the cell served by the base station 24 (eNB) experience RLFs. In this embodiment, the RLFs are due to too late HOs from the cell served by the base station 24 (eNB) to a cell served by one of the base stations 34, 36 in the UTRAN. The RLFs are detected by the UEs (UE1 and UE2) and, in response, the UEs (UE1 and UE2) start corresponding timers (T$_F$).

Initially, the UEs (UE1 and UE2) reconnect to the UTRAN after the RLFs. Thereafter, at a time (t2), UE1 reconnects to the LTE RAN (e.g., by an IRAT HO from the UTRAN to the LTE RAN) and a triggering event for sending an RLF report for the RLF at t0 occurs. UE1 may reconnect to the same cell in the LTE RAN in which the RLF occurred or a different cell in the LTE RAN. In response to the triggering event for sending the RLF report, UE1 stops the timer (T$_F$) and transmits a failure report (i.e., an RLF report) including the value of the timer (T$_F$) to the serving base station 24 of UE1 in the LTE RAN. If the serving base station 24 is different than the base station 24 (eNB) serving the cell in which the RLF occurred, then the serving base station 24 forwards the failure report to the base station 24 (eNB) serving the cell in which the connection failure occurred. Upon receiving the failure report, the MRO function 48 of the base station 24 (eNB) classifies the failure report based on the value of the timer (T$_F$) included in the failure report, which in this case is t2-t1, and the value of the timer (T$_{MRO}$) at the base station 24 (eNB) at the time of receiving the failure report, which in this case is t2-t0. Here, the value of the timer (T$_F$) is less than the value of the timer (T$_{MRO}$) and, as such, the failure report is classified as being current, or on time, for a next iteration of the MRO process performed by the MRO function 48 of the base station 24 (eNB) at a time (t3). Note that the timer (T$_{MRO}$) is restarted at the time (t3) in response to one or more mobility adjustments made by the MRO function 48 at the time (t3).

Sometime thereafter, at a time (t4), UE2 reconnects to the LTE RAN (e.g., by an IRAT HO from the UTRAN to the LTE RAN). UE2 may reconnect to the same cell in the LTE RAN in which the RLF occurred or a different cell in the LTE RAN. After reconnecting to the LTE RAN, a triggering event for reporting the RLF failure that occurred at t0 occurs at a time (t4). The triggering event may be, for example, reception of a request for any failure reports from the LTE RAN. In response, UE2 stops the timer (T$_F$) and transmits a failure report (i.e., an RLF report) including the value of the timer (T$_F$) to the serving base station 24 of UE2 in the LTE RAN. If the serving base station 24 is different than the base station 24 (eNB) serving the cell in which the RLF occurred, then the serving base station 24 forwards the failure report to the base station 24 (eNB) serving the cell in which the connection failure occurred. Upon receiving the failure report, the MRO function 48 of the base station 24 (eNB) classifies the failure report based on the value of the timer (T$_F$) included in the failure report, which in this case is t4-t1, and the value of the timer ($T_{MRO}$) at the base station 24 (eNB) at the time of receiving the failure report, which in this case is t4-t3. Here, the value of the timer ($T_F$) is greater than the value of the timer ($T_{MRO}$) and, as such, the failure report is classified as being stale. As such, the failure report is not considered or considered with reduced relevance for a next iteration of the MRO process performed by the MRO function 48 of the base station 24 (eNB).

Figure 21:
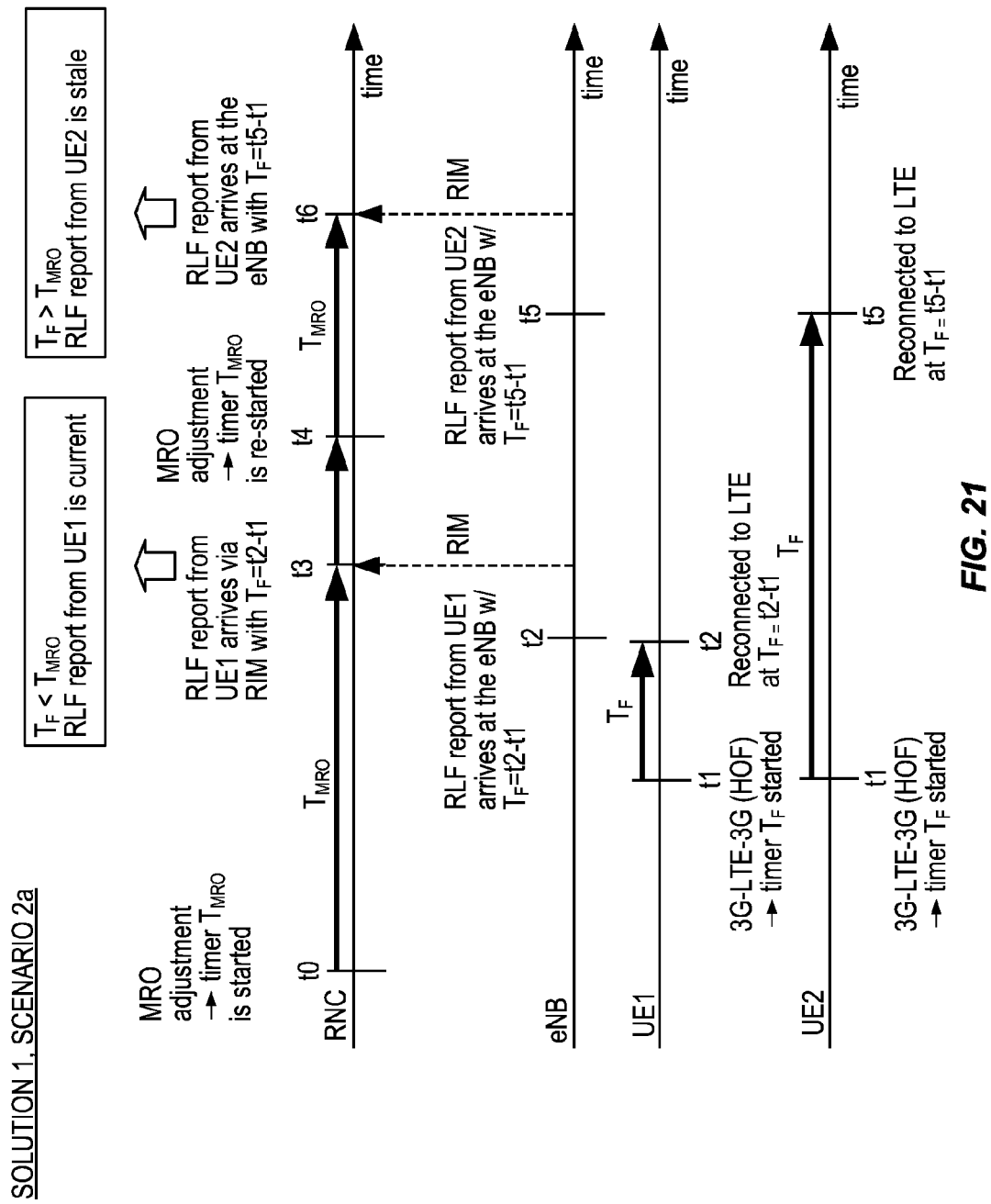

FIG. 21 illustrates the operation of the multiple RAT cellular communications system 20 of FIG. 19 for Solution 1, Scenario 2a according to one embodiment of the present disclosure. As illustrated, at a time (t0), the MRO function 48 of one of the RNCs 32 in the UTRAN performs an iteration of the MRO process that results in one or more MRO adjustments (i.e., adjustments to one or more mobility parameters). As a result of making the MRO adjustments, the RNC 32 starts a timer ($T_{MRO}$). Sometime thereafter, at a time (t1), two UEs (UE1 and UE2) in the cell served by one of the base stations 34, 36 controlled by the RNC 32 in the UTRAN experience HOFs during IRAT HOs from the cell served by the base station 34, 36 to the cell served by one of the base stations 24 (eNB) in the LTE RAN. In this embodiment, the HOFs are due to too early HOs. The HOFs are detected by the UEs (UE1 and UE2) and, in response, the UEs (UE1 and UE2) start corresponding timers ($T_F$).

Initially, the UEs (UE1 and UE2) reconnect to the UTRAN after the HOFs. Thereafter, at a time (t2), UE1 reconnects to the LTE RAN (e.g., by an IRAT HO from the UTRAN to the LTE RAN) and a triggering event for sending a failure report for the HOF occurs. In response to the triggering event for sending a failure report, UE1 stops the timer ($T_F$) and transmits a failure report for the HOF including the value of the timer ($T_F$) to the serving base station 24 of UE1 in the LTE RAN. The serving base station 24 determines that the failure report is for a HOF for an IRAT HO from the cell served by the base station 34, 36 controlled by the RNC 32 and therefore forwards the failure report to the RNC 32 via a RIM. Upon receiving the failure report, the MRO function 48 of the RNC 32 classifies the failure report based on the value of the timer ($T_F$) included in the failure report, which in this case is t2-t1, and the value of the timer ($T_{MRO}$) at the RNC 32 at the time of receiving the failure report, which in this case is t3-t0. Here, the value of the timer ($T_F$) is less than the value of the timer ($T_{MRO}$) and, as such, the failure report is classified as being current, or on time, for a next iteration of the MRO process performed by the MRO function 48 of the RNC 32 at a time (t4). Notably, the MRO function 48 of the RNC 32 may compensate for a delay resulting from the forwarding of the failure report (i.e., the delay t3-t2). The timer ($T_{MRO}$) at the RNC 32 is restarted at the time (t4) in response to one or more mobility adjustments made by the MRO function 48 at the time (t4).

Sometime thereafter, at a time (t5), UE2 reconnects to the LTE RAN (e.g., by an IRAT HO from the UTRAN to the LTE RAN) and a triggering event for sending a failure report for the HOF occurs. In response to the triggering event for sending a failure report, UE2 stops the timer ($T_F$) and transmits a failure report for the HOF including the value of the timer ($T_F$) to the serving base station 24 of UE2 in the LTE RAN. The serving base station 24 determines that the failure report is for a HOF for an IRAT HO from the cell served by the base station 34, 36 controlled by the RNC 32 and therefore forwards the failure report to the RNC 32 via a RIM. Upon receiving the failure report, the MRO function 48 of the RNC 32 classifies the failure report based on the value of the timer ($T_F$) included in the failure report, which in this case is t5-t1, and the value of the timer ($T_{MRO}$) at the RNC 32 at the time of receiving the failure report, which in this case is t6-t4. Here, the value of the timer ($T_F$) is greater than the value of the timer ($T_{MRO}$) and, as such, the failure report is classified as being stale for a next iteration of the MRO process performed by the MRO function 48 of the RNC 32. Notably, the MRO function 48 of the RNC 32 may compensate for a delay resulting from the forwarding of the failure report (i.e., the delay t6-t5). The timer ($T_{MRO}$) at the RNC 32 is restarted at the time (t4) in response to one or more mobility adjustments made by the MRO function 48 at the time (t4). Since the failure report from UE2 is stale, the failure report is not considered or is considered with reduced relevance for the next iteration of the MRO process performed by the MRO function 48 of the RNC 32. It should also be noted that the MRO function 48 of the cell in the LTE RAN may also receive and utilize the failure report, if desired.

Figure 22:
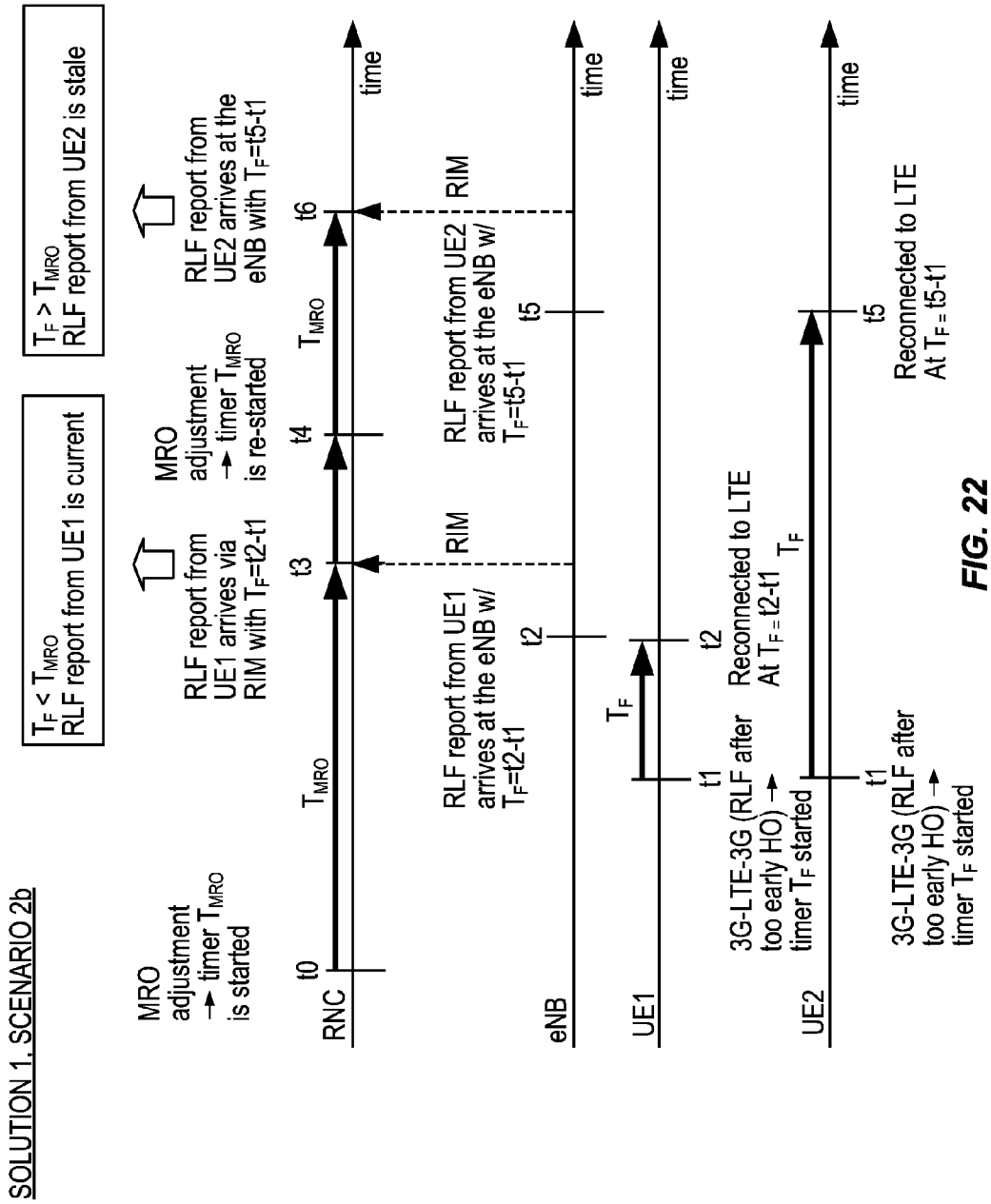

FIG. 22 illustrates the operation of the multiple RAT cellular communications system 20 of FIG. 19 for Solution 1, Scenario 2b according to one embodiment of the present disclosure. This embodiment is the same as that of FIG. 21 but where the connection failure is an RLF failure shortly after a successful IRAT HO. As such, the details are not repeated.

Figure 23:
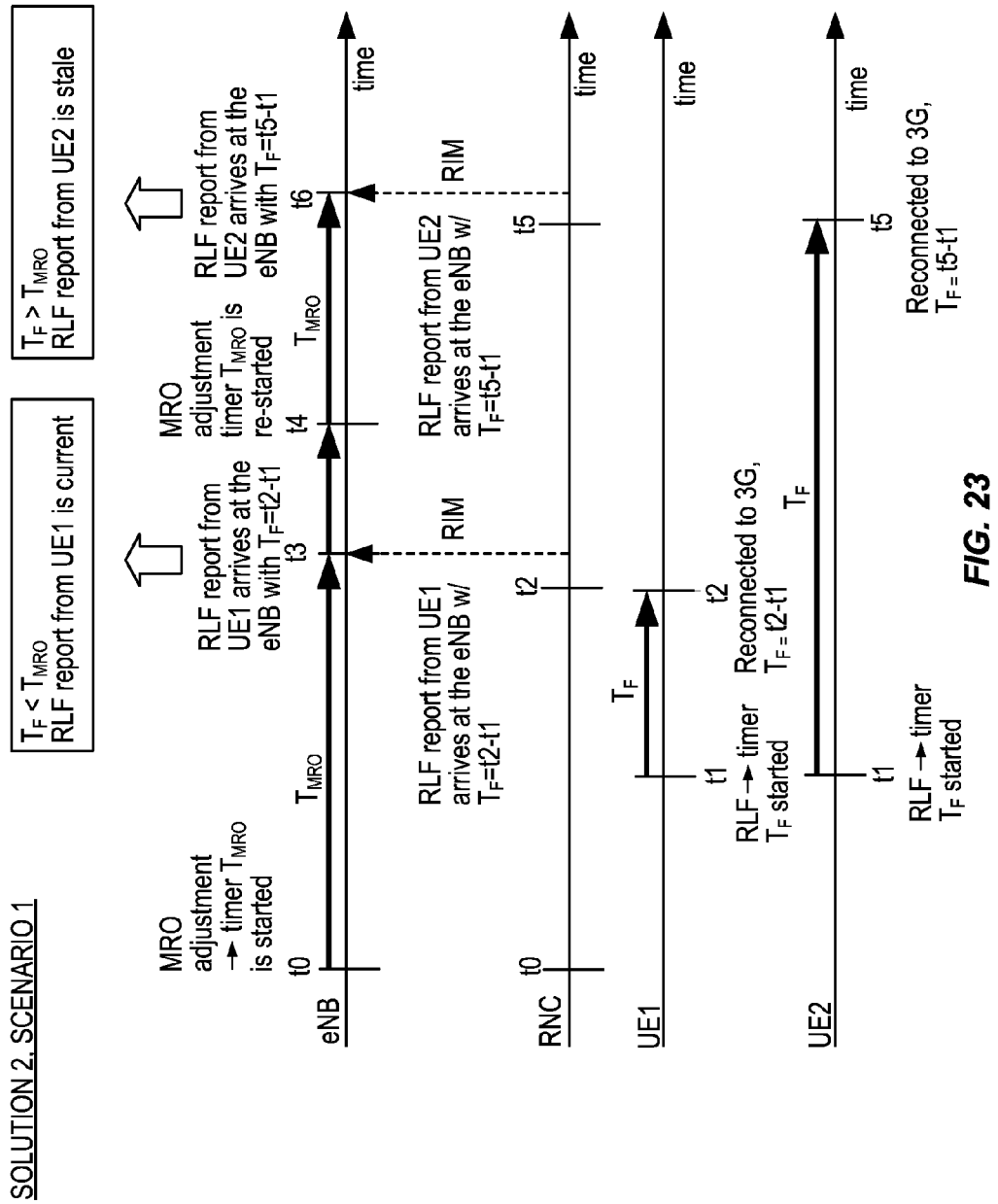

FIG. 23 illustrates the operation of the multiple RAT cellular communications system 20 of FIG. 19 for Solution 2, Scenario 1 according to one embodiment of the present disclosure. As illustrated, at a time (t0), the MRO function 48 of one of the base stations 24 (eNB) in the LTE RAN performs an iteration of the MRO process that results in one or more MRO adjustments (i.e., adjustments to one or more mobility parameters). As a result of making the MRO adjustments, the base station 24 (eNB) starts a timer ($T_{MRO}$). Sometime thereafter, at a time (t1), two UEs (UE1 and UE2) in the cell served by the base station 24 (eNB) experience RLFs. In this embodiment, the RLFs are due to too late HOs from the cell served by the base station 24 (eNB) to a cell served by one of the base stations 34, 36 in the UTRAN. The RLFs are detected by the UEs (UE1 and UE2) and, in response, the UEs (UE1 and UE2) start corresponding timers ($T_F$).

Sometime thereafter, at a time (t2), UE1 reconnects to the cell of one of the base stations 34, 36 of one of the RNCs 32 in the UTRAN and a triggering event for sending an RLF report for the RLF at t0 occurs. In response to the triggering event for sending the RLF report, UE1 stops the timer ($T_F$) and transmits a failure report (i.e., an RLF report) including the value of the timer ($T_F$) to the serving base station 34, 36 of UE1 in the UTRAN, which in turn communicates the RLF report to the RNC 32. The RNC 32 determines that the RLF report is associated with an RLF that occurred in the cell served by the base station 24 (eNB) in the LTE RAN and therefore forwards the RLF report to the base station 24 (eNB) via a RIM at a time (t3).

Upon receiving the failure report, the MRO function 48 of the base station 24 (eNB) classifies the failure report based on the value of the timer ($T_F$) included in the failure report, which in this case is t2-t1, and the value of the timer ($T_{MRO}$) at the base station 24 (eNB) at the time of receiving the failure report, which in this case is t3-t0. Here, the value of the timer ($T_F$) is less than the value of the timer ($T_{MRO}$) and, as such, the failure report is classified as being current, or on time, for a next iteration of the MRO process performed by the MRO function 48 of the base station 24 (eNB) at a time (t4). Note that the MRO function 48 may compensate for a delay associated with forwarding the RLF report from the RNC 32 to the base station 24 (eNB), which in this example is t3-t2. The timer ($T_{MRO}$) is restarted at the time (t3) in response to one or more mobility adjustments made by the MRO function 48 at the time (t4).

Sometime thereafter, at a time (t5), UE2 reconnects to the cell of one of the base stations 34, 36 of one of the RNCs 32 in the UTRAN and a triggering event for sending an RLF report for the RLF at t0 occurs. In response to the triggering event for sending the RLF report, UE2 stops the timer ($T_F$) and transmits a failure report (i.e., an RLF report) including the value of the timer ($T_F$) to the serving base station 34, 36 of UE2 in the UTRAN, which in turn communicates the RLF report to the RNC 32. The RNC 32 determines that the RLF report is associated with an RLF that occurred in the cell served by the base station 24 (eNB) in the LTE RAN and therefore forwards the RLF report to the base station 24 (eNB) via a RIM at a time (t6). Upon receiving the failure report, the MRO function 48 of the base station 24 (eNB) classifies the failure report based on the value of the timer ($T_F$) included in the failure report, which in this case is t5-t1, and the value of the timer ($T_{MRO}$) at the base station 24 (eNB) at the time of receiving the failure report, which in this case is t6-t4. Here, the value of the timer ($T_F$) is greater than the value of the timer ($T_{MRO}$) and, as such, the failure report is classified as being stale for a next iteration of the MRO process performed by the MRO function 48 of the base station 24 (eNB). Note that the MRO function 48 may compensate for a delay associated with forwarding the RLF report from the RNC 32 to the base station 24 (eNB), which in this example is t6-t5. Since the failure report from UE2 is stale, the failure report is not considered or is considered with reduced relevance for the next iteration of the MRO process performed by the MRO function 48 of the base station 24 (eNB).

Figure 24:
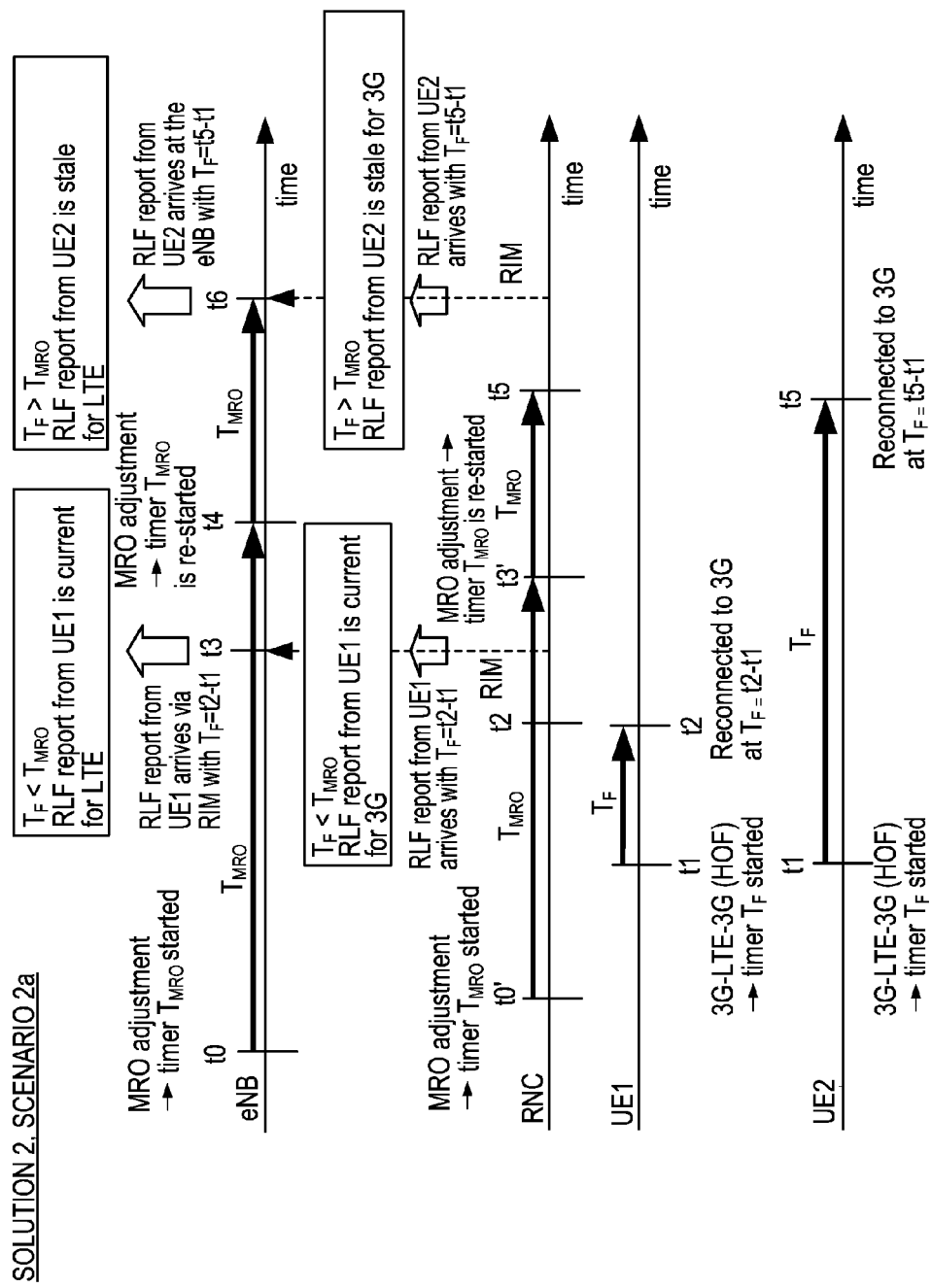

FIG. 24 illustrates the operation of the multiple RAT cellular communications system 20 of FIG. 19 for Solution 2, Scenario 2a according to one embodiment of the present disclosure. As illustrated, at a time (t0), the MRO function 48 of one of the base stations 24 (eNB) in the LTE RAN performs an iteration of the MRO process that results in one or more MRO adjustments (i.e., adjustments to one or more mobility parameters). As a result of making the MRO adjustments, the base station 24 (eNB) starts a timer ($T_{MRO}$). In addition, at a time (t0'), the MRO function 48 of one of the RNCs 32 in the UTRAN performs an iteration of the MRO process that results in one or more MRO adjustments (i.e., adjustments to one or more mobility parameters). As a result of making the MRO adjustments, the RNC 32 starts a timer ($T_{MRO}$). Sometime thereafter, at a time (t1), two UEs (UE1 and UE2) in the cell served by one of the base stations 34, 36 controlled by the RNC 32 in the UTRAN experience HOFs during IRAT HOs from the cell served by the base station 34, 36 to the cell served by one of the base stations 24 (eNB) in the LTE RAN. In this embodiment, the HOFs are due to too early HOs. The HOFs are detected by the UEs (UE1 and UE2) and, in response, the UEs (UE1 and UE2) start corresponding timers ($T_F$).

Thereafter, at a time (t2), UE1 reconnects to one of the cells in the UTRAN and a triggering event for sending a failure report for the HOF occurs. UE1 may reconnect to the same cell in which the HOF occurred or a different cell. In response to the triggering event for sending a failure report, UE1 stops the timer ($T_F$) and transmits a failure report for the HOF including the value of the timer ($T_F$) to the serving base station 34, 36 of UE1 in the UTRAN. The serving base station 34, 36 determines that the failure report is for a HOF for an IRAT HO from the cell served by the base station 34, 36 controlled by the RNC 32 to the cell served by one of the base stations 24 (eNB) in the LTE RAN. If the RNC 32 of the serving base station 34, 36 is different than the RNC 32 of the base station 34, 36 serving the cell in which the HOF occurred, the RNC 32 forwards the failure report to the RNC 32 of the base station 34, 36 serving the cell in which the HOF occurred. In addition, in this example, the RNC 32 forwards the failure report to the base station 24 (eNB) in the LTE RAN that was the target of the failed IRAT HO via a RIM.

Upon receiving the failure report, the base station 24 (eNB) in the LTE RAN classifies the failure report based on the value of the timer ($T_F$) included in the failure report, which in this case is t2-t1, and the value of the timer ($T_{MRO}$) at the base station 24 (eNB) at the time of receiving the failure report, which in this case is t3-t0. Here, the value of the timer ($T_F$) is less than ($T_{MRO}$) and, as such, the failure report is classified as being current, or on time, for a next iteration of the MRO process performed by the MRO function 48 of the base station 24 (eNB) at a time (t4). Notably, the MRO function 48 of the base station 24 (eNB) may compensate for a delay resulting from the forwarding of the failure report (i.e., the delay t3-t2). The timer ($T_{MRO}$) at the base station 24 (eNB) is restarted at the time (t4) in response to one or more mobility adjustments made by the MRO function 48 at the time (t4).

At the RNC 32, the MRO function 48 of the RNC 32 classifies the failure report based on the value of the timer ($T_F$) included in the failure report, which in this case is t2-t1, and the value of the timer ($T_{MRO}$) at the RNC 32 at the time of receiving the failure report, which in this case is t2-t0'. Here, the value of the timer ($T_F$) is less than ($T_{MRO}$) and, as such, the failure report is classified as being current, or on time, for a next iteration of the MRO process performed by the MRO function 48 of the RNC 32 at a time (t3'). The timer ($T_{MRO}$) at the RNC 32 is restarted at the time (t3') in response to one or more mobility adjustments made by the MRO function 48 at the time (t3').

Sometime thereafter, at a time (t5), UE2 reconnects to one of the cells in the UTRAN and a triggering event for sending a failure report for the HOF occurs. UE2 may reconnect to the same cell in which the HOF occurred or a different cell. In response to the triggering event for sending a failure report, UE2 stops the timer ($T_F$) and transmits a failure report for the HOF including the value of the timer ($T_F$) to the serving base station 34, 36 of UE2 in the UTRAN. The serving base station 34, 36 determines that the failure report is for a HOF for an IRAT HO from the cell served by the base station 34, 36 controlled by the RNC 32 to the cell served by one of the base stations 24 (eNB) in the LTE RAN. If the RNC 32 of the serving base station 34, 36 is different than the RNC 32 of the base station 34, 36 serving the cell in which the HOF occurred, the RNC 32 forwards the failure report to the RNC 32 of the base station 34, 36 serving the cell in which the HOF occurred. In addition, in this example, the RNC 32 forwards the failure report to the base station 24 (eNB) in the LTE RAN that was the target of the failed IRAT HO via a RIM.

Upon receiving the failure report, the base station 24 (eNB) in the LTE RAN classifies the failure report based on the value of the timer ($T_F$) included in the failure report, which in this case is t5-t1, and the value of the timer ($T_{MRO}$) at the base station 24 (eNB) at the time of receiving the failure report, which in this case is t6-t4. Here, the value of the timer ($T_F$) is greater than ($T_{MRO}$) and, as such, the failure report is classified as being stale for a next iteration of the MRO process performed by the MRO function 48 of the base station 24 (eNB). Notably, the MRO function 48 of the base station 24 (eNB) may compensate for a delay resulting from the forwarding of the failure report. Since the failure report from UE2 is stale, the failure report is not considered or is considered with reduced relevance for the next iteration of the MRO process performed by the MRO function 48 of the base station 24 (eNB).

At the RNC 32, the MRO function 48 of the RNC 32 classifies the failure report from UE2 based on the value of the timer ($T_F$) included in the failure report, which in this case is t5-t1, and the value of the timer ($T_{MRO}$) at the RNC 32 at the time of receiving the failure report, which in this case is t5-t3'. Here, the value of the timer ($T_F$) is greater than ($T_{MRO}$) and, as such, the failure report is classified as being stale for a next iteration of the MRO process performed by the MRO function 48 of the RNC 32. Since the failure report from UE2 is stale, the failure report is not considered or is considered with reduced relevance for the next iteration of the MRO process performed by the MRO function 48 of the RNC 32.

Figure 25:
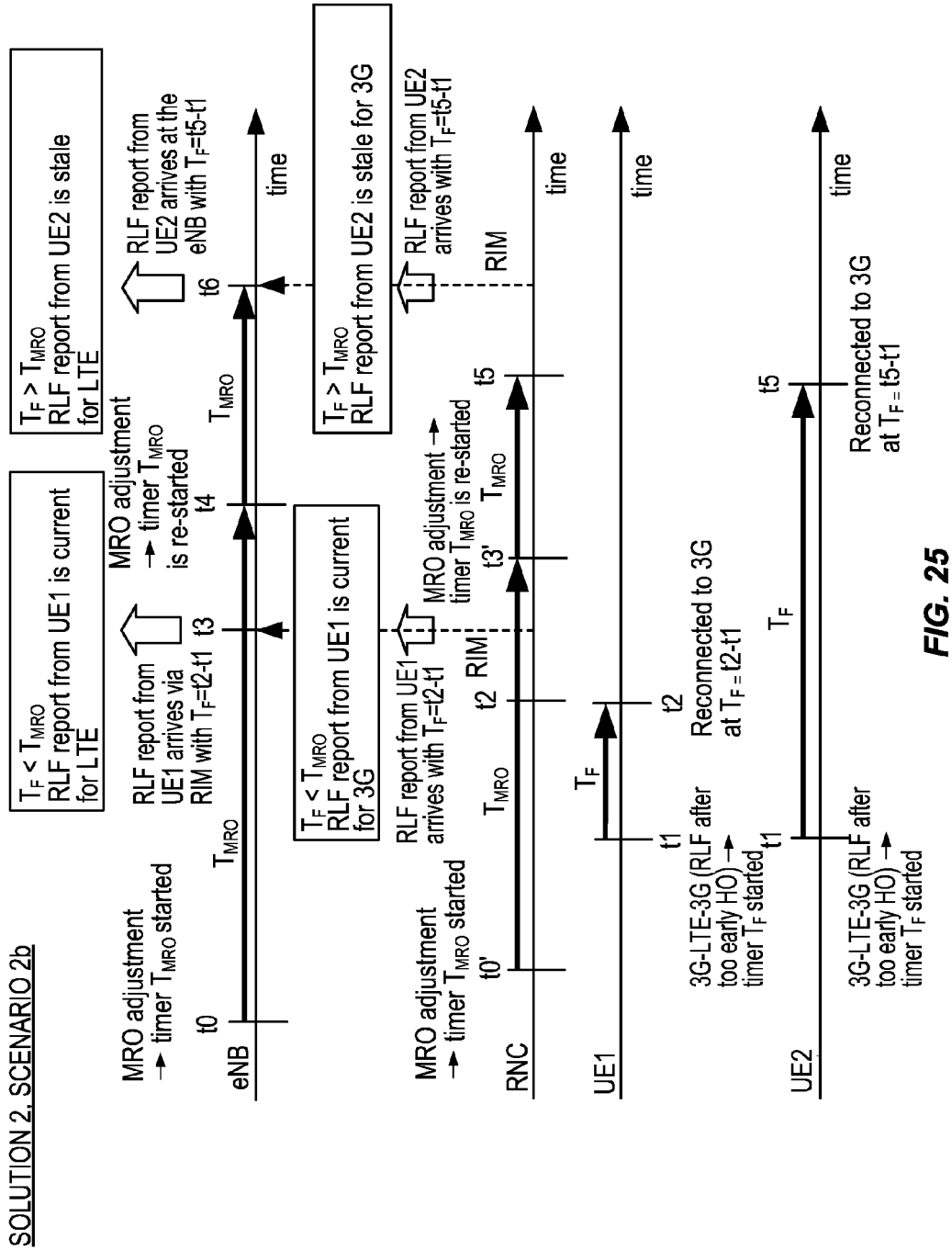

FIG. 25 illustrates the operation of the multiple RAT cellular communications system 20 of FIG. 19 for Solution 2, Scenario 2b according to one embodiment of the present disclosure. This embodiment is the same as that of FIG. 24 but where the connection failure is an RLF failure shortly after a successful IRAT HO. As such, the details are not repeated.

Figure 27:
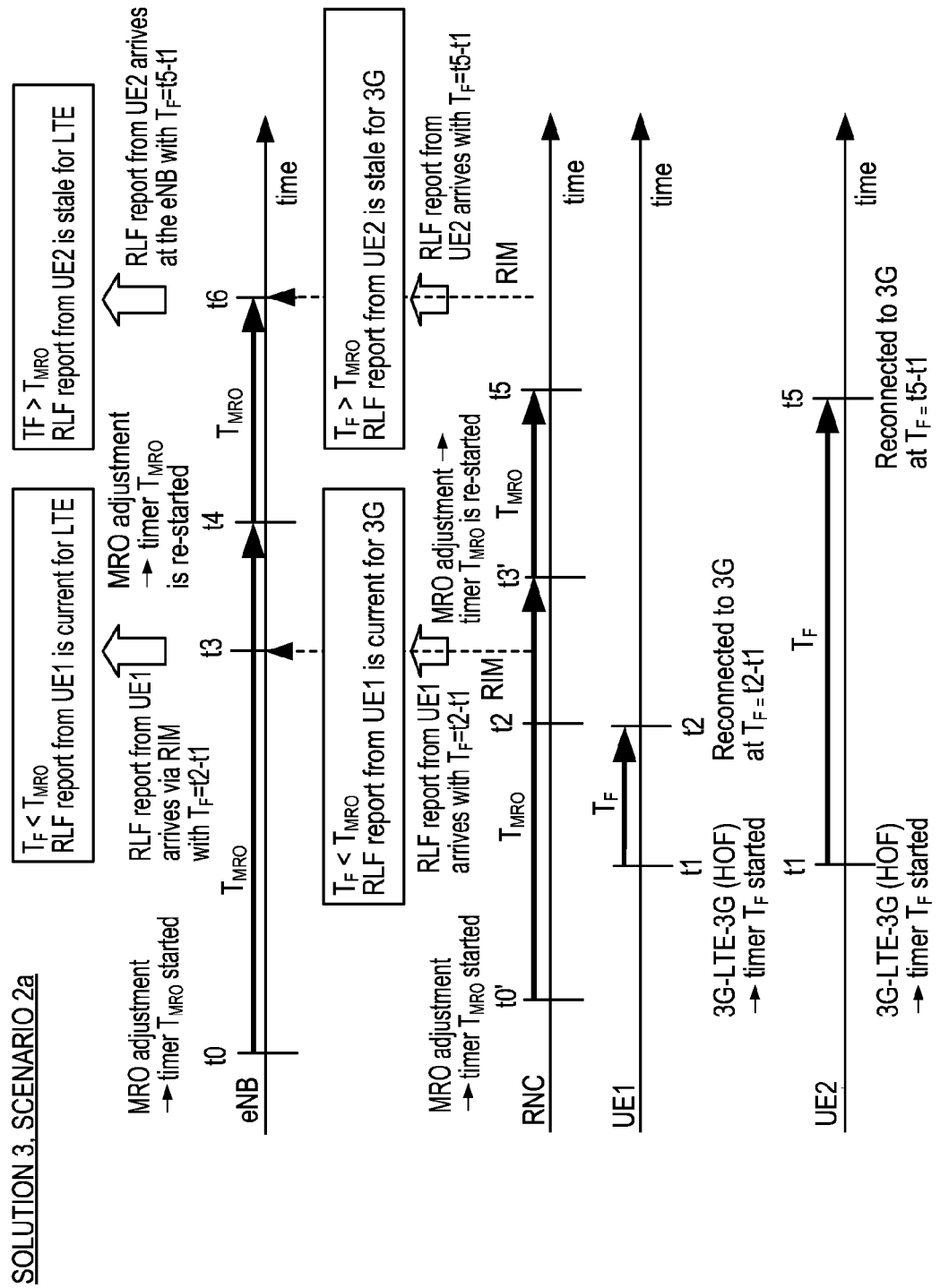
Figure 28:
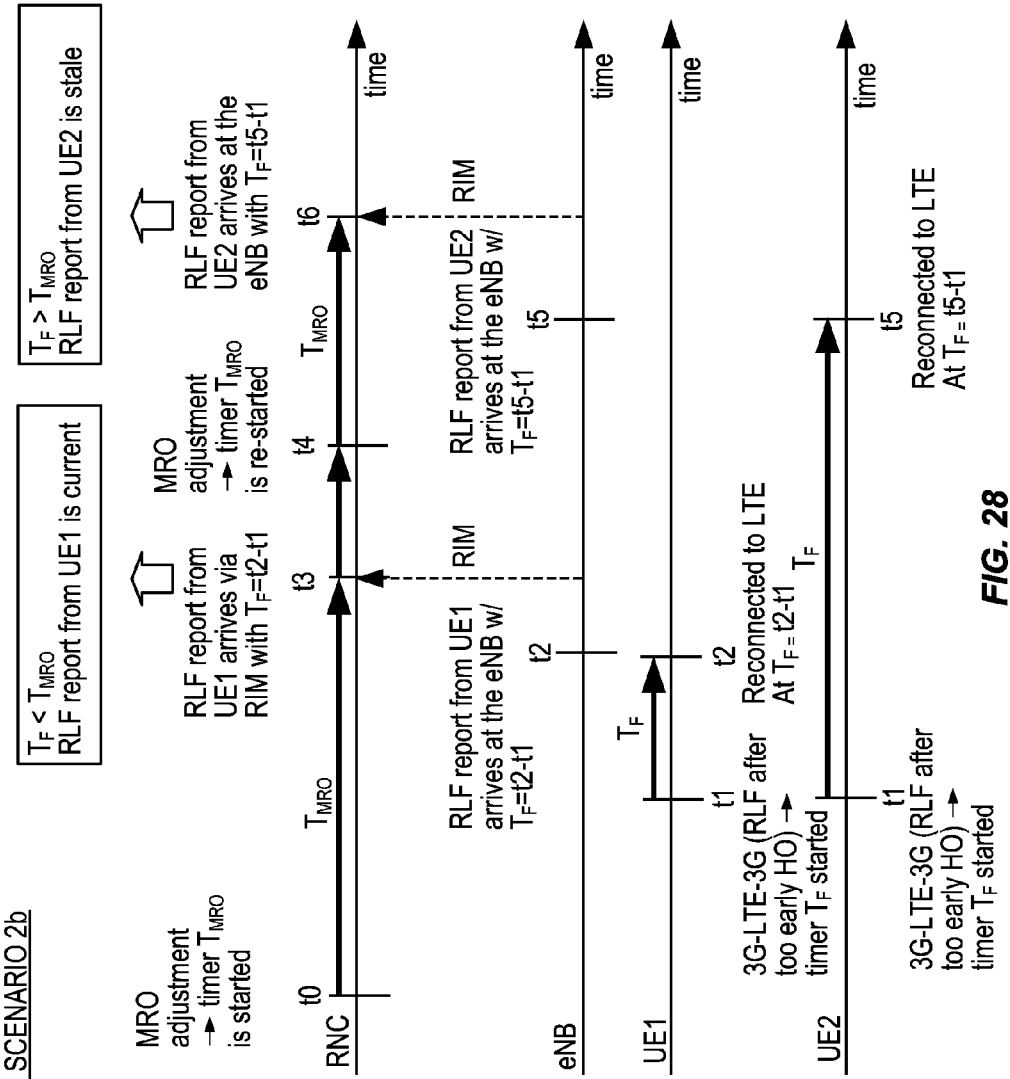

FIGS. 26-28 illustrate the operation of the multiple RAT cellular communications system 20 of FIG. 21 for Solution 3, Scenarios 1, 2a, and 2b, respectively. For Solution 3, an RLF is reported in the RAT where the connection failure occurred and a HOF is reported in the RAT of the cell in which the HO command was received. Solution 3 for Scenarios 1, 2a, and 2b are therefore the same as Solution 1, Scenario 1, Solution 2, Scenario 2a, and Solution 1, Scenario 2b, respectively. The operation of the multiple RAT cellular communications system 20 for these embodiments is the same as that discussed above with respect to FIG. 20 (Solution 1, Scenario 1), FIG. 24 (Solution 2, Scenario 2a), and FIG. 22 (Solution 1, Scenario 2b), respectively. As such, the details are not repeated.

Figure 29:
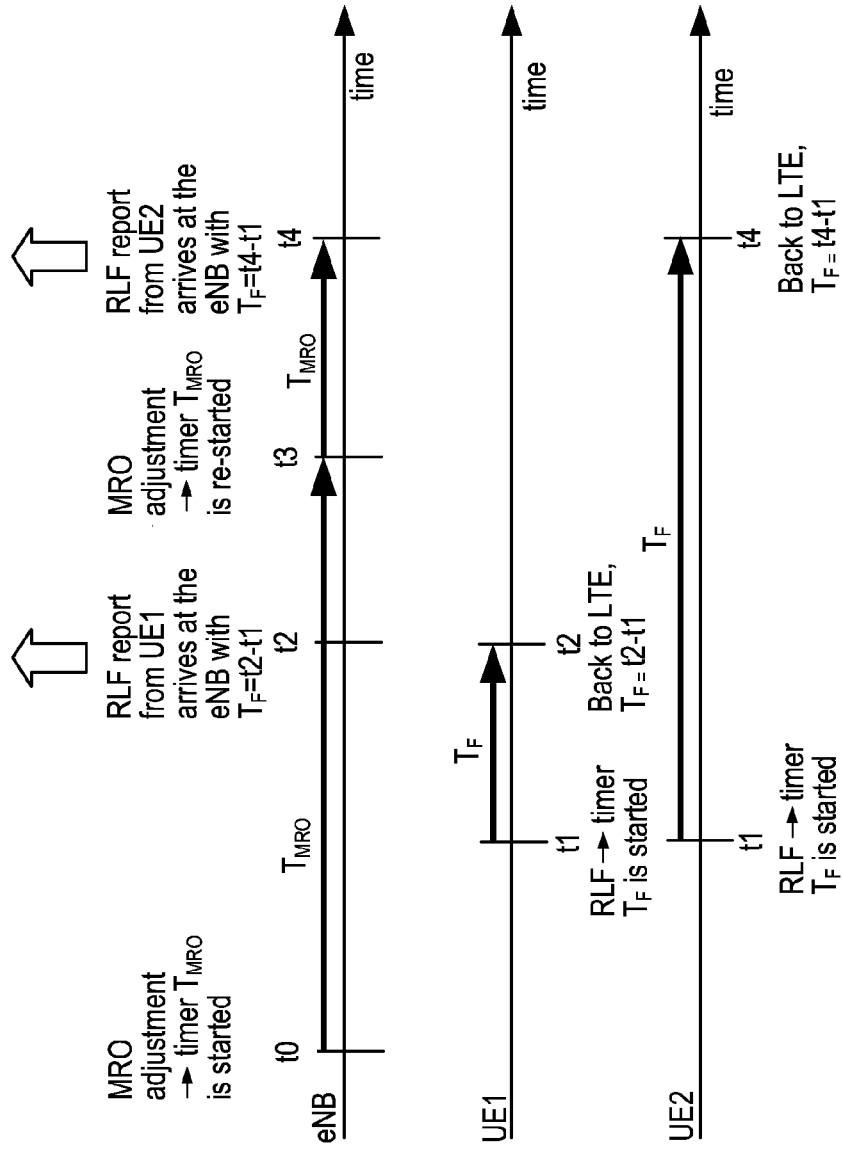

FIG. 29 illustrates the operation of the multiple RAT cellular communications system 20 of FIG. 19 for Solution 4, Scenario 1. The operation of the multiple RAT cellular communications system 20 for this embodiment is the same as that discussed above with respect to FIG. 20

(Solution 1, Scenario 1). As such, the details are not repeated. For Solution 4, Scenarios 2a and 2b, the connection failure is not reported by the UE, but is rather detected by the appropriate RNC 32. Note that while FIGS. 20-29 focus on IRAT HOs, the systems and methods disclosed herein are equally applicable to reporting of other types of mobility connection failures such as, for example, connection failures for intra-RAT HOs.

FIG. 30 is a block diagram of a UE 50 according to one embodiment of the present disclosure. This discussion of the UE 50 is equally applicable to the UEs 26, 28, 38, 40, 42, and 44 of FIG. 19. As illustrated, the UE 50 includes a radio subsystem 52 and a processing subsystem 54. The radio subsystem 52 includes one or more transceivers (not shown) generally including analog and, in some embodiments, digital components for sending and receiving data to and from the cellular communications networks 22 and 23 (FIG. 19). In particular embodiments, each of the one or more transceivers may represent or include one or more Radio Frequency (RF) transceivers, or separate RF transmitter(s) and receiver(s), capable of transmitting suitable information wirelessly to and receiving suitable information from other network components or nodes. From a wireless communications protocol view, the radio subsystem 52 implements at least part of Layer 1 (i.e., the Physical or "PHY" Layer).

The processing subsystem 54 generally implements any remaining portion of Layer 1 as well as functions for higher layers in the wireless communications protocol (e.g., Layer 2 (data link layer), Layer 3 (network layer), etc.). In particular embodiments, the processing subsystem 54 may comprise, for example, one or several general-purpose or special-purpose microprocessors or other microcontrollers programmed with suitable software and/or firmware to carry out some or all of the functionality of the UE 50 described herein. In addition or alternatively, the processing subsystem 54 may comprise various digital hardware blocks (e.g., one or more Application Specific Integrated Circuits (ASICs), one or more off-the-shelf digital and analog hardware components, or a combination thereof) configured to carry out some or all of the functionality of the UE 50 described herein. Additionally, in particular embodiments, the above-described functionality of the UE 50 may be implemented, in whole or in part, by the processing subsystem 54 executing software or other instructions stored on a non-transitory computer-readable medium, such as Random Access Memory (RAM), Read Only Memory (ROM), a magnetic storage device, an optical storage device, or any other suitable type of data storage components. Of course, the detailed operation for each of the functional protocol layers, and thus the radio subsystem 52 and the processing subsystem 54, will vary depending on both the particular implementation as well as the standard or standards supported by the UE 50.

FIG. 31 is a block diagram of a base station 56 according to one embodiment of the present disclosure. This discussion of the base station 56 is equally applicable to the base stations 24, 34, and 36 of FIG. 19. As illustrated, the base station 56 includes a radio subsystem 58, one or more communication interfaces 60, and a processing subsystem 62. While only one radio subsystem 58 is illustrated, the base station 56 may include multiple radio subsystems 58 (e.g., one radio subsystem 58 per sector). The radio subsystem 58 generally includes analog and, in some embodiments, digital components for sending and receiving data to and from UEs within the corresponding cell. In particular embodiments, the radio subsystem 58 may represent or include one or more RF transceiver(s), or separate RF transmitter(s) and receiver(s), capable of transmitting suitable information wirelessly to and receiving suitable information from other network components or nodes. From a wireless communications protocol view, the radio subsystem 58 implements at least part of Layer 1 (i.e., the Physical or "PHY" Layer).

The one or more communication interfaces 60 provide connectivity to other network nodes as appropriate. For instance, the one or more communication interfaces 60 may include communication interface(s) to other base stations 56 (e.g., an X2 interface in the LTE cellular communications network 22) and communication interface(s) to the corresponding core network 30, 46 (e.g., S1 communication interface in the LTE cellular communications network 22).

The processing subsystem 62 generally implements any remaining portion of Layer 1 not implemented in the radio subsystem 58 as well as functions for higher layers in the wireless communications protocol (e.g., Layer 2 (data link layer), Layer 3 (network layer), etc.). In particular embodiments, the processing subsystem 62 may comprise, for example, one or several general-purpose or special-purpose microprocessors or other microcontrollers programmed with suitable software and/or firmware to carry out some or all of the functionality of the base station 56 described herein. In addition or alternatively, the processing subsystem 62 may comprise various digital hardware blocks (e.g., one or more ASICs, one or more off-the-shelf digital and analog hardware components, or a combination thereof) configured to carry out some or all of the functionality of the base station 56 described herein. Additionally, in particular embodiments, the above described functionality of the base station 56 may be implemented, in whole or in part, by the processing subsystem 62 executing software or other instructions stored on a non-transitory computer-readable medium, such as RAM, ROM, a magnetic storage device, an optical storage device, or any other suitable type of data storage components.

Lastly, FIG. 32 is a block diagram of one of the RNCs 32 of FIG. 19 according to one embodiment of the present disclosure. As illustrated, the RNC 32 includes one or more communication interfaces 64 and a processing subsystem 66. The one or more communication interfaces 64 provide connectivity to other network nodes as appropriate. In particular, the one or more communication interfaces 64 include communication interface(s) to the corresponding base stations 34, 36 (FIG. 19) and communication interface(s) to the core network 46. The processing subsystem 66 may comprise, for example, one or several general-purpose or special-purpose microprocessors or other microcontrollers programmed with suitable software and/or firmware to carry out some or all of the functionality of the RNC 32 described herein. In addition or alternatively, the processing subsystem 66 may comprise various digital hardware blocks (e.g., one or more ASICs, one or more off-the-shelf digital and analog hardware components, or a combination thereof) configured to carry out some or all of the functionality of the RNC 32 described herein. Additionally, in particular embodiments, the above described functionality of the RNC 32 may be implemented, in whole or in part, by the processing subsystem 66 executing software or other instructions stored on a non-transitory computer-readable medium, such as RAM, ROM, a magnetic storage device, an optical storage device, or any other suitable type of data storage components.

As discussed above, conventional connection failure reporting results in delays between the time at which connection failures occur and the time at which the connection failures are reported to the network. Delays in reporting the connection failure may be due to a long delay before the UE reconnects to the RAN where the connection failure is to be reported (e.g., Solution 1), due to the UE transitioning to an idle mode for a long time before reconnecting to the RAN where the connection failure is to be reported, or due to a failure of the cellular communications network to request reporting of the RLF report for a long time. Thus, an MRO function that performs MRO for a cell in, for example, an LTE RAN may perform an MRO process that results in adjustment(s) to mobility parameters (i.e., mobility adjustments) for the cell based on failure reports received in a timely manner. However, due to the issue of delayed reporting, the MRO function may continue to receive failure reports after the mobility adjustment(s) have been made where the failure reports are relevant to a time window prior to making the mobility adjustment(s). Using conventional MRO algorithms, these "stale" failure reports are still considered with the same relevance as timely failure reports for the next iteration of the MRO process. The stale failure reports may lead to incorrect or undesirable mobility adjustments and slow convergence of the cellular communications network to a state of stable mobility.

While the concepts disclosed herein are not limited to any particular advantage, the concepts disclosed herein address the issue of delayed connection failure reporting. In particular, using appropriate timing data, failure reports are classified as stale or current. Stale failure reports can then be discarded or used in a subsequent iteration of the MRO algorithm. As a result, incorrect or undesirable mobility adjustments and slow convergence of the cellular communications network to a state of stable mobility due to delayed failure reports are avoided.

The following acronyms are used throughout this disclosure.

3GPP $3^{rd}$ Generation Partnership Project
ASIC Application Specific Integrated Circuit
BS Base Station
EDGE Enhanced Data Rates for Global Evolution
eNB Enhanced Node B
GERAN Global System for Mobile Communications Enhanced Data Rates for Global Evolution Radio Access Network
GSM Global System for Mobile Communications
HO Handover
HOF Handover Failure
IRAT Inter-Radio Access Technology
LTE Long Term Evolution
MME Mobility Management Entity
MRO Mobility Robustness Optimization
OAM Operations and Maintenance
RACH Random Access Channel
RAM Random Access Memory
RAN Radio Access Network
RAT Radio Access Technology
RF Radio Frequency
RIM Radio Access Network Information Message
RLF Radio Link Failure
RNC Radio Network Controller
RRC Radio Resource Control
RSRP Reference Signal Received Power
RSRQ Reference Signal Received Quality
S-GW Serving Gateway
TS Technical Specification
UE User Equipment or User Element
UMTS Universal Mobile Telecommunications System
UTRAN Universal Terrestrial Radio Access Network
WG3 Working Group 3

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a node in a cellular communications network, comprising: receiving a failure report associated with a connection failure for a mobile user equipment, wherein the failure report comprises a first timer value that defines an amount of time that has expired between a time at which the connection failure occurred and a time at which the mobile user equipment transmitted the failure report; determining when the connection failure occurred with respect to a most recent mobility adjustment made by the node based on the first timer value from the failure report and a second timer value that defines an amount of time that has expired since the most recent mobility adjustment was made by the node; and if the connection failure occurred before the most recent mobility adjustment made by the node, classifying the failure report as a stale failure report and considering the stale failure report with a weighting factor in a next iteration of the mobility adjustment, wherein the weighting factor is in a range between zero and one but excluding one.

2. The method of claim 1 wherein the second timer value is maintained by the node and determining when the connection failure occurred with respect to the most recent mobility adjustment made by the node comprises comparing the first timer value from the failure report to the second timer value.

3. The method of claim 1 wherein determining when the connection failure occurred with respect to the most recent mobility adjustment made by the node comprises obtaining, from another node, information indicative of a comparison of the first timer value from the failure report and the second timer value.

4. The method of claim 1 further comprising, if the connection failure occurred after the most recent mobility adjustment made by the node, classifying the failure report as a current failure report.

5. The method of claim 4 further comprising performing a subsequent process to determine whether new mobility adjustments are desired and, if so, make one or more new mobility adjustments, wherein the subsequent process does not consider the failure report if the failure report is classified as a stale failure report and does consider the failure report if the failure report is classified as the current failure report.

6. The method of claim 4 further comprising performing a subsequent process to determine whether new mobility adjustments are desired and, if so, make one or more new mobility adjustments, wherein the subsequent process considers the failure report if the failure report is classified as the current failure report and considers the failure report with a reduced relevance if the failure report is classified as a stale failure report.

7. The method of claim 1 further comprising:
making the most recent mobility adjustment;
starting the second timer upon making the most recent mobility adjustment such that the second timer defines an amount of time that has expired since making the most recent mobility adjustment;
after making the most recent mobility adjustment and starting the second timer, receiving a plurality of failure reports associated with a plurality of connection failures for a plurality of user equipments; and
for each failure report of the plurality of failure reports:
determining when a connection failure of the plurality of connection failures that corresponds to the failure report occurred with respect to the most recent mobility adjustment made by the node based on the second timer and a first timer included in the failure report that defines an amount of time that has expired between a time that the connection failure occurred and a time at which a corresponding user equipment of the plurality of user equipments transmitted the failure report;
if the connection failure occurred before the most recent mobility adjustment made by the node, classifying the failure report as a stale failure report; and
if the connection failure occurred after the most recent mobility adjustment made by the node, classifying the failure report as a current failure report.

8. The method of claim 7 further comprising:
performing a process to determine whether new mobility adjustments are desired and, if so, making one or more new mobility adjustments based on ones of the plurality of failure reports classified as current failure reports but not ones of the plurality of failure reports classified as stale failure reports; and
restarting the second timer if the process made one or more new mobility adjustments.

9. The method of claim 7 further comprising:
performing a process to determine whether new mobility adjustments are desired and, if so, making one or more new mobility adjustments based on the plurality of failure reports such that a first subset of the plurality of failure reports classified as stale failure reports are given less relevance as compared to a second subset of the plurality of failure reports classified as current failure reports; and
restarting the second timer if the process made one or more new mobility adjustments.

10. The method of claim 1 wherein the node is a base station of the cellular communications network, and receiving the failure report comprises receiving the failure report from the user equipment.

11. The method of claim 1 wherein the node is a first base station of the cellular communications network, and receiving the failure report comprises receiving the failure report from a second node of the cellular communications network.

12. The method of claim 1 wherein the node is a base station of a first radio access network operating according to a first radio access technology, and receiving the failure report comprises receiving the failure report from a node associated with a second radio access network operating according to a second radio access technology, wherein the second radio access network obtained the failure report from the user equipment.

13. A node in a radio access network of a cellular communications network, comprising: a radio subsystem configured to provide wireless connectivity to mobile user equipments located within a cell served by the node; one or more communication interfaces configured to provide connectivity to at least one of the group consisting of: a core network of the cellular communications network and one or more other nodes in the radio access network; and a processing subsystem associated with the radio subsystem and the one or more communication interfaces configured to: receive a failure report associated with a connection failure for a mobile user equipment wherein the failure report comprises a first timer value that defines an amount of time that has expired between a time at which the connection failure occurred and a time at which the mobile user equipment transmitted the failure report; determine when the connection failure occurred with respect to a most recent mobility adjustment made by the node based on the first timer value from the failure report and a second timer value that defines an amount of time that has expired since the most recent mobility adjustment was made by the node; and if the connection failure occurred before the most recent mobility adjustment made by the node, classify the failure report as a stale failure report and consider the stale failure report with a weighting factor in a next iteration of the mobility adjustment, wherein the weighting factor is in a range between zero and one but excluding one.

* * * * *